United States Patent
Johnson et al.

(10) Patent No.: US 9,412,183 B2
(45) Date of Patent: Aug. 9, 2016

(54) METHOD FOR COLOR BALANCING UNDERWATER PHOTOGRAPHY

(71) Applicant: Apple Inc., Cupertino, CA (US)

(72) Inventors: Garrett M. Johnson, San Francisco, CA (US); Russell Y. Webb, San Jose, CA (US); Timothy D. Cherna, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 395 days.

(21) Appl. No.: 14/059,418

(22) Filed: Oct. 21, 2013

(65) Prior Publication Data

US 2015/0110396 A1    Apr. 23, 2015

Related U.S. Application Data

(60) Provisional application No. 61/956,183, filed on Oct. 18, 2013.

(51) Int. Cl.
 *G06T 11/00* (2006.01)
 *H04N 1/60* (2006.01)

(52) U.S. Cl.
 CPC ............ *G06T 11/001* (2013.01); *H04N 1/6077* (2013.01)

(58) Field of Classification Search
 USPC .......................................... 382/167
 See application file for complete search history.

(56) References Cited

U.S. PATENT DOCUMENTS

| | | | | | |
|---|---|---|---|---|---|
| 5,438,363 | A * | 8/1995 | Ejima | ................... | H04N 9/735 348/223.1 |
| 6,108,441 | A * | 8/2000 | Hiratsuka | ............. | G06T 11/001 382/167 |
| 7,272,257 | B2 * | 9/2007 | Toba | .................... | G03B 27/735 382/162 |
| 7,986,833 | B2 * | 7/2011 | Shen | ................... | H04N 1/6058 382/162 |
| 8,159,532 | B2 * | 4/2012 | Kodama | ................ | G03B 17/00 348/81 |
| 8,396,292 | B2 * | 3/2013 | Itoh | ......................... | H04N 1/56 382/167 |
| 8,731,288 | B2 * | 5/2014 | Tsukada | .................. | G06T 1/00 345/604 |
| 8,823,726 | B2 * | 9/2014 | Pettigrew | ................ | H04N 9/73 345/589 |
| 8,872,936 | B2 * | 10/2014 | Ichikawa | ............... | H04N 9/735 348/223.1 |
| 8,891,864 | B2 * | 11/2014 | Pettigrew | ................ | G09G 5/02 345/593 |
| 9,087,385 | B2 * | 7/2015 | Fredlund | ................ | G06T 5/009 |
| 2013/0176416 | A1 * | 7/2013 | Fukui | .................... | H04N 9/735 348/81 |
| 2014/0071264 | A1 * | 3/2014 | Seo | ........................ | H04N 9/735 348/81 |

* cited by examiner

*Primary Examiner* — Ishrat I Sherali
(74) *Attorney, Agent, or Firm* — Adeli LLP

(57) ABSTRACT

A system and method that receives and edits image data of an underwater scene in a digital image in order to remove undesirable tints from objects in the scene. In some embodiments, colors near the color of the water itself are protected to leave the water looking blue. Removing undesirable tints without removing the tint of the water itself results in images with more realistic coloring of people and objects in the scene, without eliminating the color cues (e.g., blue water) that indicate that the image is a photograph of an underwater scene.

26 Claims, 14 Drawing Sheets

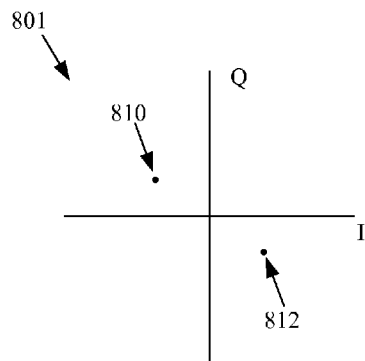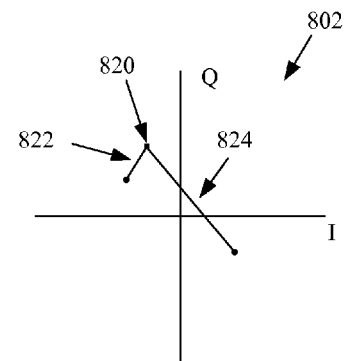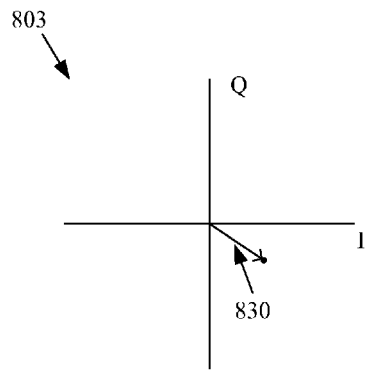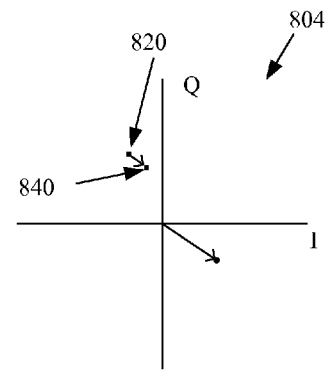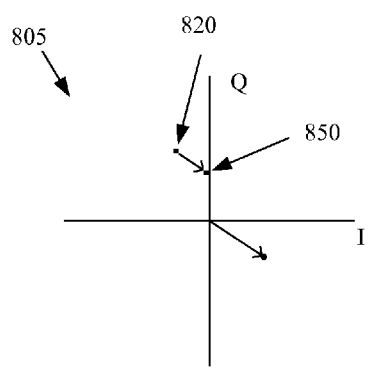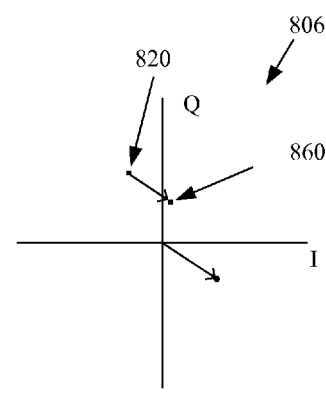
Fig. 8

METHOD FOR COLOR BALANCING UNDERWATER PHOTOGRAPHY

BACKGROUND

In photography, the color of objects in a photographic image is determined by the intrinsic color of the photographed object and the color of the light or lights that illuminated the object. Lights that illuminate an object are tinted by reflecting off of colored items or passing through a medium that filters out other colors. Photographing things underwater usually results in an overall tinted (often bluish or greenish tint) illumination. The amount of light filtered out, and the colors of the light that are filtered out depend on the depth and the contents of the water (e.g., murky, salt, fresh, etc.). Accordingly, objects that are lit by light passing through water appear incorrectly tinted, while the water itself appears correctly tinted (e.g., tinted the color of water).

One type of photographic editing, called "color balancing" or "white balancing" attempts to remove some or all of the effects of the specific light color on the photographed object (e.g., to remove a green or blue tint of a photographed person when the person was illuminated by green or light, such as the light underwater). Various image editing programs apply white balancing techniques to remove the effects of tinted light on an image. Without applying a color balancing technique, the colors of items in the water (e.g., people's skin) are tinted by the color of the light that filters through the water. However, when previous color balancing techniques are applied to an image taken underwater, or taken of an underwater scene from above the water, the color corrections result in images that do not look as though they were taken underwater. The previous color balancing techniques do not preserve the color of the water.

BRIEF SUMMARY

Some embodiments provide an application (e.g., an image organizing and editing application) that receives and edits image data of an underwater scene in a digital image in order to remove undesirable tints from objects in the scene. In some embodiments, colors near the color of the water itself are protected to leave the water looking blue. Removing undesirable tints without removing the tint of the water itself results in images with more realistic coloring of people and objects in the scene, without eliminating the color cues (e.g., blue water) that indicate that the image is a photograph of an underwater scene.

Each pixel in an image can be represented in a format that includes three chromatic values (e.g., an RGB format). Alternatively, each image can be represented in a luminance/chrominance color system (e.g., a YIQ or $YC_bC_r$ color component system) by a luminance value Y and two chrominance values. In some embodiments, an image is converted from one format to the other in order to perform color adjustments in a format best suited for those adjustments.

The image editing applications of some embodiments adjust the colors of an image while protecting colors that are close to the color of water in the image by a multi-step process. In some embodiments, the application determines a designated water color for the image. The application performs a gamma adjustment of the image in an RGB format. The application then translates the RGB formatted image into a YIQ formatted image. The application then adjusts the colors in the YIQ formatted image away from the water color. In the course of adjusting the colors in the YIQ format, the application of some embodiments reduces the magnitude of the color adjustment of those pixels with colors close to the designated water color. The application of some embodiments determines a reduction in the magnitude of the color adjustment of some pixel's colors based on a balance setting (e.g., set by a user or set automatically). The application of some embodiments also reduces or increases the color adjustments of all pixels based on an overall strength setting (e.g., set by a user or set automatically). In the applications of some embodiments, the strength setting applies to all pixels, while the balance setting applies only to pixels closer to the color of water than to the complement of the color of water. The application of some embodiments uses an additional factor to dampen the adjustment depending on the luminance of the individual pixel being adjusted. For example, the application of some embodiments applies smaller adjustments to very bright or very dark pixels than to pixels of mid-range brightness.

The application of some embodiments, after adjusting the colors in, e.g., a YIQ colorspace, translates the image back into RGB colorspace. The application then applies an inverse gamma adjustment to the image. Adjusting the color of a pixel in a YIQ colorspace, then performing an inverse gamma correction in RGB colorspace can result in a pixel that is brighter or darker than the original pixel. Making the pixel brighter or darker can be an unwanted side effect of the color adjustment and the inverse gamma transformation. Therefore, in order to keep the adjusted color, but undo the unwanted change to the brightness of the pixel, the application of some embodiments converts the adjusted image and the original image into a luminance-chrominance colorspace (e.g., the YIQ colorspace) and replaces the luminance values of the color adjusted, inverse gamma adjusted image with the corresponding luminance values of the original image. Restoring the original luminance levels results in an image in which the colors have been adjusted, but any changes to the luminance levels of the pixels (e.g., resulting from the non-linear nature of gamma adjustments) will be undone. The application then retranslates the color adjusted YIQ image (with the luminance levels restored) into the RGB colorspace.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

FIG. 8 conceptually illustrates the adjustment of a color close to the water color for various balance values.

DETAILED DESCRIPTION

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples described. It will be clear to one of ordinary skill in the art that various controls depicted in the figures are examples of controls provided for reasons of clarity. Other embodiments may use other controls while remaining within the scope of the present embodiment. For example, a control depicted herein as a hardware control may be provided as a software icon control in some embodiments, or vice versa. Similarly, the embodiments are not limited to using only the various indicators and icons depicted in the figures.

A photograph of an underwater scene typically contains areas that are the color of water (e.g., blue areas in the background) and areas that are not the color of water (e.g., the faces of people in the scene). Generally, even the areas that are not the color of water are somewhat tinted blue by the color of the water because the color of the water tints the light that illuminates the scene. In prior art programs, a color balance tool would remove the tinting from the entire scene. However, this had the effect of greatly reducing or removing the blue color from the water visible in the scene (e.g., the water in the background). The color of the background water would then be more neutral (e.g., somewhat gray).

In contrast, some embodiments provide an image editing application that removes the tinting from areas that are not close to the color of water, while applying a reduced adjustment (or no adjustment) to areas that have colors close to the color of water. In some embodiments, the application removes the tinting by shifting the colors of the pixels away from a calculated water color (e.g., a color based on the color of areas in the image, set by a user as the color of water, etc.). In performing color adjustments to a photograph of an underwater scene, the application of some embodiments provides a control to determine whether to fully apply this color correction to the areas that are the color of water, or reduce the color correction effects on those areas.

Figure 1:
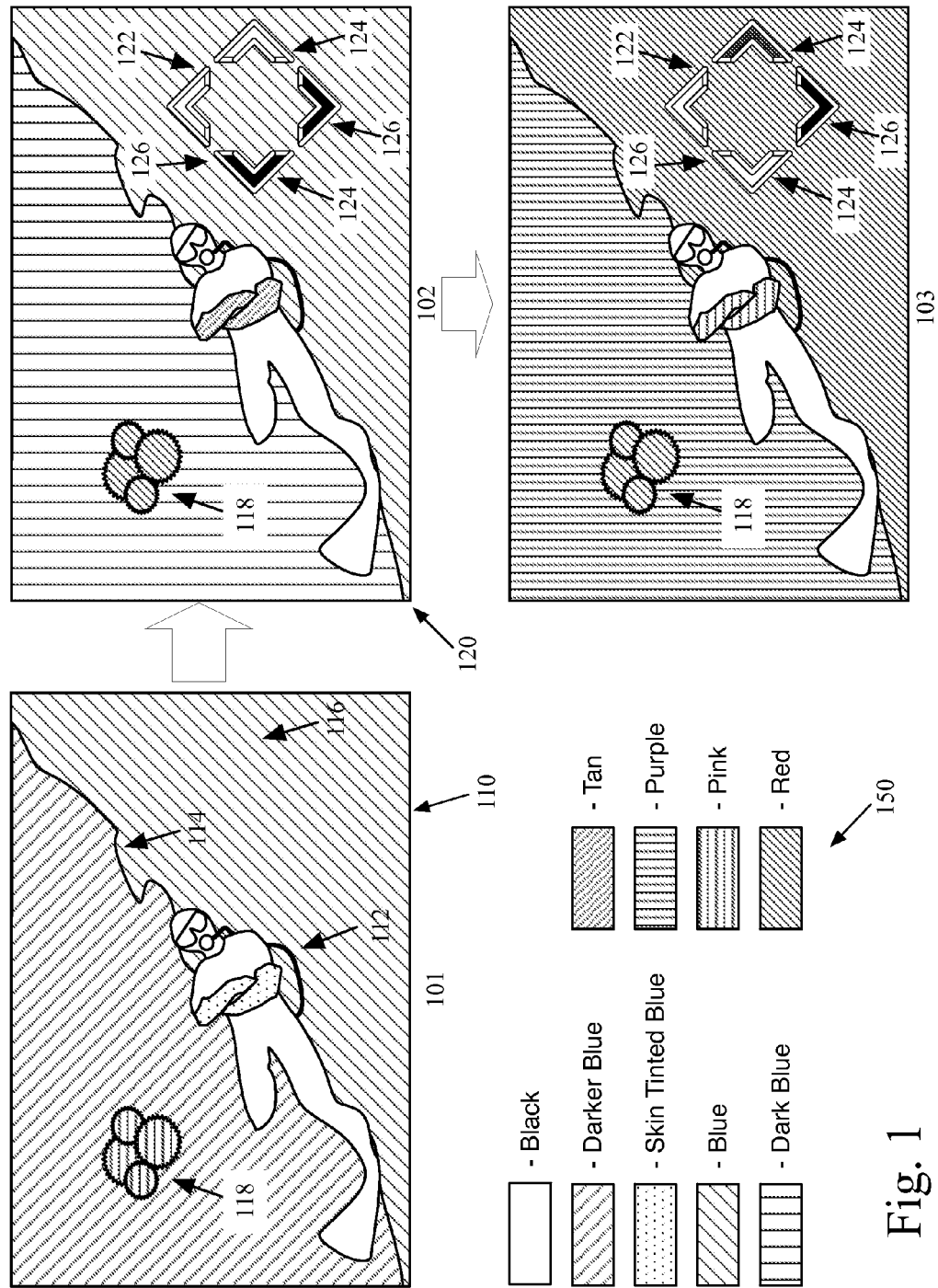
FIG. 1 illustrates the color correction of an underwater image by a program of some embodiments.

FIG. 1 illustrates the color correction of an underwater image by a program of some embodiments. FIG. 1 is shown in three stages 101-103. The several colors of the image 110 in the various stages are represented as various patterns in different areas of the image. Legend 150 provides a color key that associates each pattern with a particular color. In stage 101, the original image 110 displays an underwater scene of a diver 112 in front of a reef 114 and a blue tinted (i.e., shown as blue in legend 150) area 116 of the surface of the water. In stage 101, the diver 112 is shown with skin tinted blue by the ambient light of the scene. The areas of the reef that aren't dark are predominantly a darker blue than the water, with pink highlights 118 (shown in the pattern identified by legend 150 as pink in stage 101 to contrast with the stronger red color of highlights 118 in later stages).

Stage 102 includes an interface of an image editing application 120, with controls 122, which include horizontal arrows 124 and vertical arrows 126. In this stage, the image editing application 120 has adjusted the colors of the image 110. In the illustrated embodiment, the setting represented by the arrows 124 and 126 is shown by the brightness of the arrow. For example, when a setting is maximized in a particular direction (e.g., to the right) the control arrow in that direction is set to white, while the control arrow in the opposite direction is set to black. One of ordinary skill in the art will understand that other embodiments use other indicators of the state of the setting (e.g., sliders, etc.) and that some embodiments do not display an overt indicator of the setting. Here, the control 122 is set with the horizontal control arrows 124 set all the way to the right (i.e., the right arrow is white and the left arrow is black) and the vertical control arrows 126 set all the way at the top. In this embodiment, this setting of the horizontal arrows 124 commands the application to preserve colors near the color of the water, while adjusting the colors of the image. The setting of the vertical arrows 126 commands the application to set the strength of the color adjustments to maximum (within the limitations imposed by the color adjustment system of the application 120). The diver 112 in the image 110 has colors that are mostly different from the color of water. Accordingly, the application has shifted the colors of the diver (e.g., skin tones) away from the blue tinted colors of the original image. The shift makes the diver 112 stand out, with more vibrant skin tones than the previous blue tinted skin tones. The red highlights 118 in the reef 114 also stand out more clearly in stage 102 with a more vibrant red color. The blue areas of the image remain blue because the controls 122 are set to preserve colors near the color of the water.

In stage 103, the vertical arrows 126 of controls 122 are still set to maximum. However, the horizontal arrows are set all the way to the left (i.e., the left arrow is white and the right arrow is black), commanding the image editing application 120 not to protect colors near the color of the water while adjusting the colors of the image. Therefore, in contrast to the image 110 in stage 102, in stage 103 the image editing application 120 has adjusted the colors of the image 110 without protecting the color of the water. Accordingly, the colors of the reef 114 and the area 116 have been adjusted to redder colors (i.e., purple for reef 114 and red for area 116 as shown in legend 150).

In some embodiments, the color of the water is determined from an average value of the colors of a set of pixels in the image (e.g., the pixels in a user selected area, an automatically selected area, or all the pixels in the image). The average color of the water is usually a color with blue as the predominant color component (i.e., the water has a bluish tint). However, in some underwater images, the background color has a greenish tint rather than a bluish tint. A green tint to the water may be undesirable as compared to blue. Accordingly, in some embodiments, the application adjusts the image from green toward a more neutral color. Some embodiments perform color adjustments in a YIQ colorspace. In the YIQ colorspace, the −I −Q direction is the direction of green. Therefore, the application shifts the image in the opposite color direction from green (i.e., +I +Q, toward magenta).

In FIG. 1, the average color of image 110 is an intense blue. The application shifted the water color slightly toward +I and +Q, but the effect was small relative to the intensity of the color of the background and the direction of the color shift was not directly away from the blue direction in colorspace. Therefore, the background remained blue. As mentioned above, in some underwater images, the average color has a greenish tint rather than a bluish tint. Furthermore, in some images the tint is slight rather than intense. The color adjuster changes the colors of such images more visibly as the small shift toward +I and +Q is relatively larger compared to the original color intensity and is directly opposed to the original color (green, with a value of −I and −Q).

Figure 2:
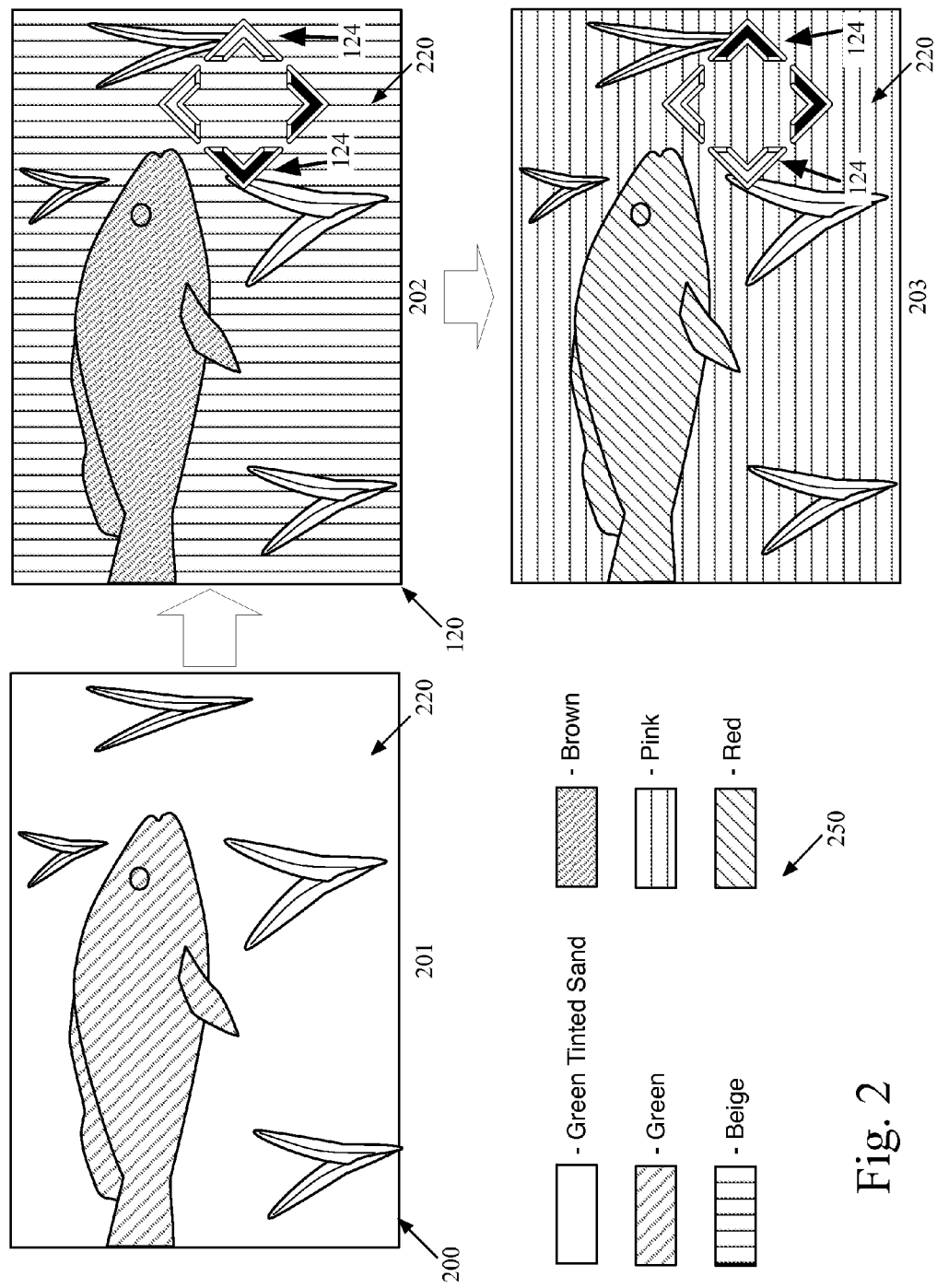
FIG. 2 illustrates color adjustment of an image with a background color that is a low intensity green color.

FIG. 2 illustrates color adjustment of an image 200 with a background color that is a low intensity green color. The figure is shown in three stages 201-203 with legend 250. Legend 250 provides a color key that associates each pattern with a particular color.

In stage 201, the original image 200 has a greenish tint. In stage 202, the horizontal arrows 124 are set all the way to the right (i.e., the right arrow is white and the left arrow is black). Therefore, the image editing application 120 has adjusted the colors of the image while protecting the pixels that have colors close to the color of the water (as adjusted by the shift away from green). Accordingly, the sand 220 in image 200 in stage 202 is a beige color rather than the greenish color of stage 201. In stage 203, the horizontal arrows 124 are set all the way to the left (i.e., the left arrow is white and the right arrow is black). Therefore, image editing application 120 has adjusted the colors of the image while not protecting the pixels that have colors close to the color of the water (as adjusted by the shift away from green). Accordingly, the colors of the image including the sand have been significantly shifted toward magenta (away from green) and the image 200 as a whole, in stage 203, has a magenta tint (e.g., the sand 220 has turned pink).

The shift in color of the background sand 220 from stage 201 to stage 202 is more significant than the shift in color of the blue tinted water surface 116 in stages 101 and 102 of FIG. 1 because of the shift of the whole image in the +I and +Q direction. The shift is also more significant because of the lower starting intensity of the greenish tint of the background sand 220 in FIG. 2 as compared to the blue tint of the surface 116 in FIG. 1.

Section I, below, describes color adjustments of some embodiments. Then section II describes a software architecture of some embodiments. Section III describes a mobile device on which image editing applications of some embodiments run. Section IV describes another computing device on which the image editing applications of some embodiments run.

I. Color Adjustment

A. Calculating Water Color

The application of some embodiments determines a "water color" based on a modified average of the color of the pixels in an area of the image. This method of determining the color of water in an image is based on an assumption that the colors of the image would average out to a neutral gray unless there were some tint to all the colors of the image caused by the light that illuminated the scene captured in the image. The light in an underwater scene is filtered through the water and is tinted a blue to green color by the water. Accordingly, the average colors of the pixels in the image represent an initial value of the color of the water. The average color is then modified for aesthetic reasons. This modified average is referred to herein as the "color of water" or the "water color". The applications of some embodiments translate the modified average into a different color space and selectively move the colors of the image away from the determined color of water.

In some embodiments, the area used to determine the water color is an area selected by a user. In other embodiments, the area used is determined automatically by the application (e.g., the entire area of the image). In some embodiments, the average is determined in an RGB colorspace and then modified and converted to a YIQ colorspace. The color of the water is then used to adjust the colors of the image.

Figure 3:
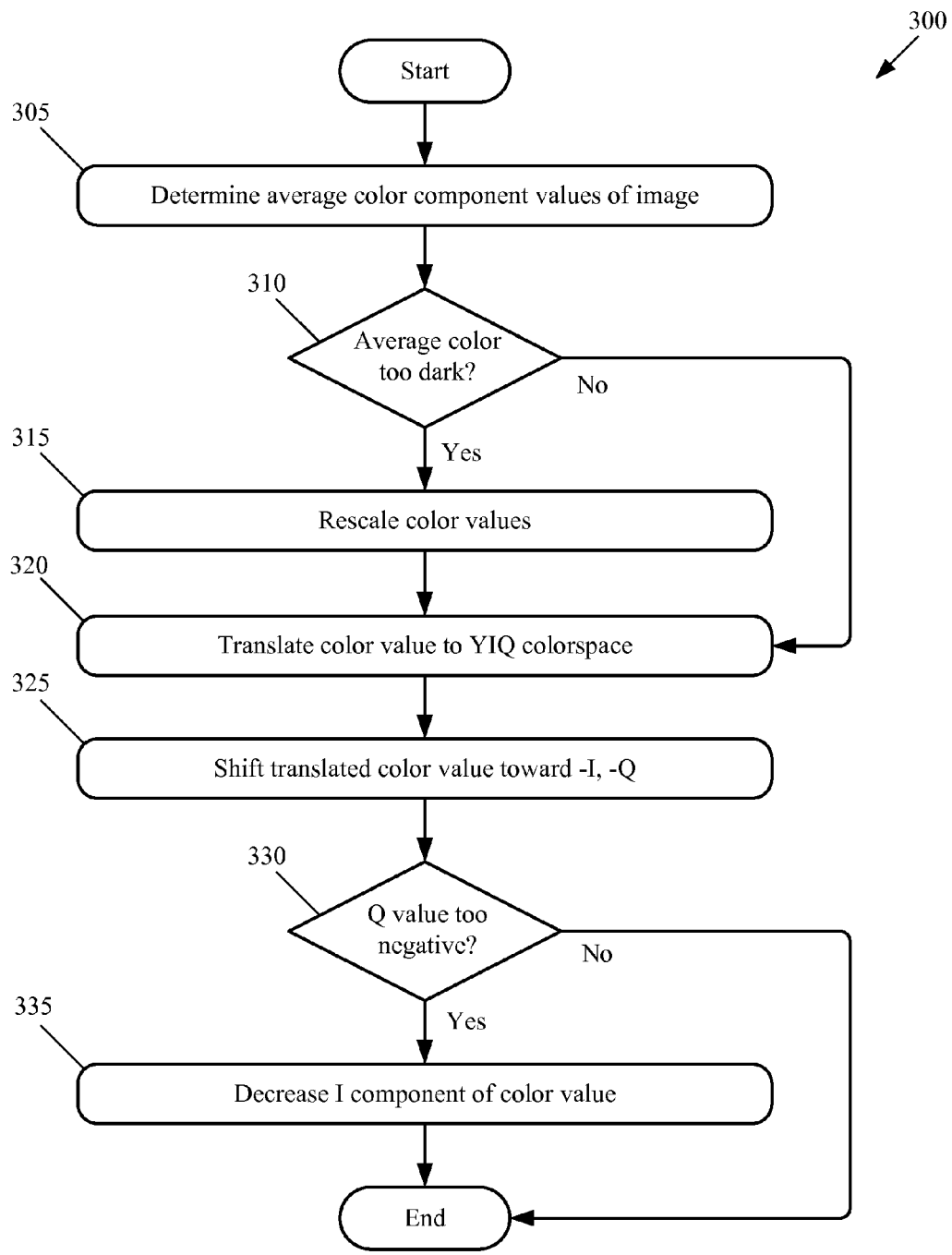
FIG. 3 conceptually illustrates a process in which an application of some embodiments determines a water color for an underwater image.
Figure 4:
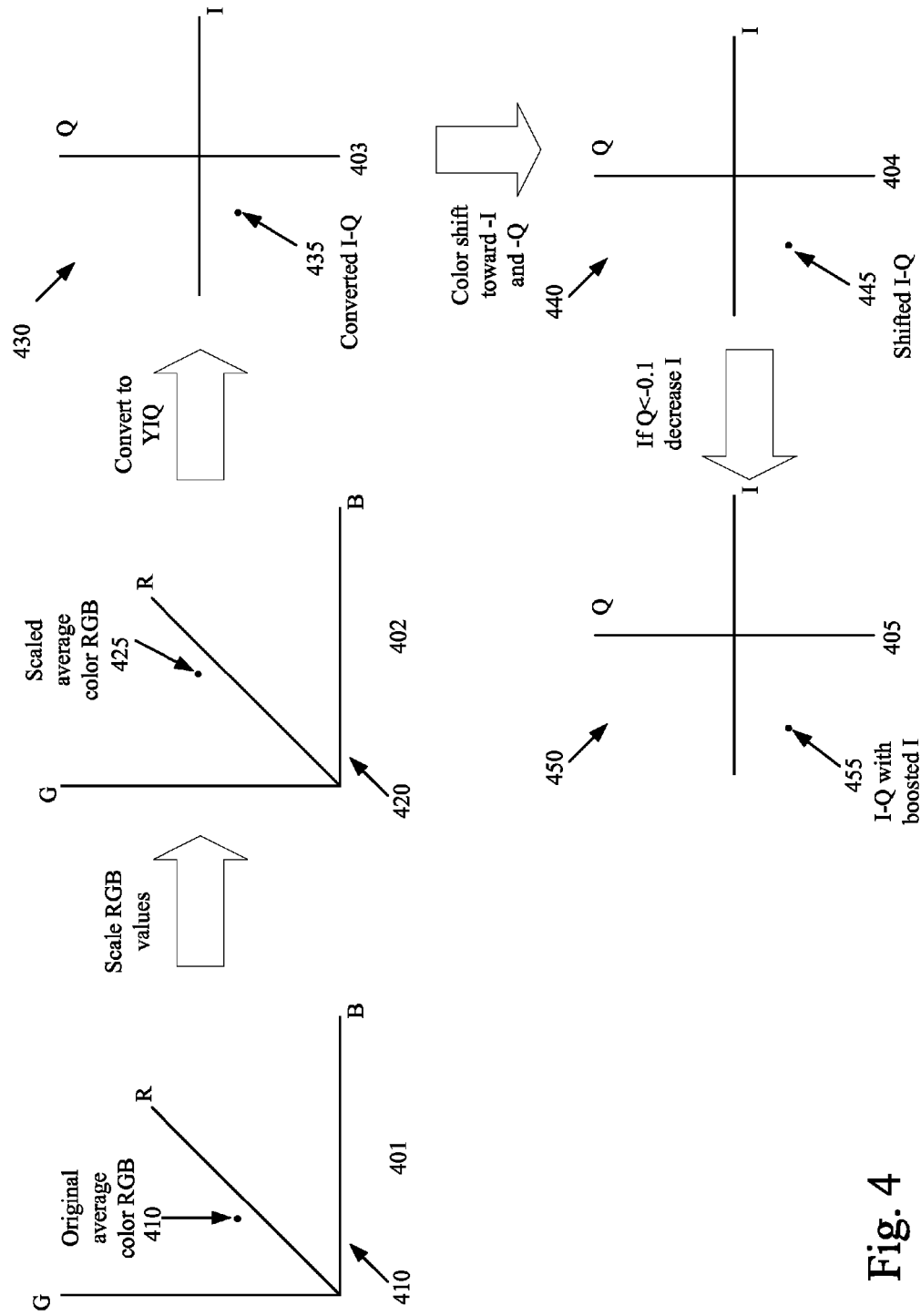
FIG. 4 conceptually illustrates the determination of some embodiments of a water color for an underwater image.

FIG. 3 conceptually illustrates a process 300 in which an application of some embodiments determines a water color for an underwater image. FIG. 3 will be described with respect to FIG. 4. FIG. 4 conceptually illustrates the effects of process 300 through five stages 401-405.

The process 300 determines (at 305) an average value of the color component values of the pixels in an image. That is, one average value is determined for red, another for blue, and a third for green. In some embodiments, the average is the arithmetic mean of the values. In some embodiments, the R, G, and B values are scaled from 0 to 1 before the averages are determined. In some embodiments, the values are determined mathematically and no visible graph is displayed. In FIG. 4, stage 401, the red ($R_{ave}$), green ($G_{ave}$), and blue ($B_{ave}$) average color values are displayed on a 3-axis graph 410 as point 415.

The process 300 then determines (at 310) whether the average pixel color is too dark. When the average pixel color is too dark (e.g., the sum of the average R, G, and B values is below a particular threshold) then the process 300 rescales (at 315) the average color values. In some embodiments, the threshold is ½ of the maximum possible value for one color component and therefore ⅙ of the maximum possible value of the sums of the color component values. In some embodiments, the R, G, and B values are rescaled with eq. (1A)-(1C) if the sum of the averages is below the threshold. However, the average values in such embodiments are not rescaled if the sum of the averages is at or above the threshold.

$$R_{water} = (-4*(R_{ave}+G_{ave}+B_{ave})+3)*R_{ave} \quad (1A)$$

$$G_{water} = (-4*(R_{ave}+G_{ave}+B_{ave})+3)*G_{ave} \quad (1B)$$

$$B_{water} = (-4*(R_{ave}+G_{ave}+B_{ave})+3)*B_{ave} \quad (1C)$$

In eq. (1A)-(1C): $R_{water}$ is the scaled value of the average R value of the pixels in the selected area. $R_{ave}$ is the actual average R value of the pixels in the selected area. $G_{water}$ is the scaled value of the average G value of the pixels in the selected area. $G_{ave}$ is the actual average G value of the pixels in the selected area. $B_{water}$ is the scaled value of the average B value of the pixels in the selected area. $B_{ave}$ is the actual average B value of the pixels in the selected area.

In FIG. 4, in stage 401, the sum of the R, G, and B values of the selected area of the image are below the threshold. Accordingly, in stage 402, the rescaled values ($R_{water}$, $G_{water}$, and $B_{water}$) are shown on the 3-axis graph 420 as point 425. Point 425 has slightly larger R, G, and B values than $R_{ave}$, $G_{ave}$, and $B_{ave}$ of stage 401. When the process 300 (of FIG. 3) determines (at 310) that the average color is not too dark, the process 300 skips operation 315 and moves on to operation 320.

The applications of some embodiments make color adjustments of the image in a YIQ colorspace. Therefore, the process 300 of FIG. 3 further translates (at 320) the water color into the YIQ colorspace in order to maintain consistency with an image which has been translated into YIQ colorspace. In some embodiments, the color adjustments are made to the chromatic components (I and Q) but not to the Y component. Accordingly the graphs in stages 403-405 of FIG. 4 show only I and Q axes. In stage 403, the 2-axis graph 430 shows the I and Q values, represented by point 435, translated from the R, G, and B values, represented by point 425, from graph 420 of stage 402.

In some embodiments, one or both of the I and Q values are calculated in a non-traditional, non-linear manner. For example, the applications of some embodiments use eqs. (2A) and (2B) to calculate the I and Q values.

$$I = 0.596R - 0.2755G - 0.321B \quad (2A)$$

$$Q = 0.212R^{0.5} - 0.523G^{0.5} + 0.311B^{0.5} \quad (2B)$$

In eqs. (2A)-(2B), R is the rescaled value of $R_{ave}$. G is the rescaled value of $G_{ave}$. B is the rescaled value of $B_{ave}$. One of ordinary skill in the art will recognize eq. (2A) as a slightly modified version of the standard conversion function from RGB to I. Eq. (2B) is also a slightly modified conversion, but with a gamma correction (using a gamma value of 0.5) applied to the RGB values before using the RGB values to calculate the Q value. In other embodiments, different gamma adjustments (e.g., ¼, ⅛, or 1/16) are made to the R, G, and B values used to calculate I, Q, or both.

As described above with respect to FIG. 2, a green tinge to an image may be considered undesirable. Accordingly, in some embodiments, the colors of the image are adjusted away from green. The process 300 of FIG. 3 performs this adjustment by shifting (at 325) the water color toward the –I, –Q direction (i.e., toward green). The application of some embodiments shifts the image colors away from the color of water. Therefore, when the application adjusts the water color toward green the result is a shift of the post-adjustment image colors away from green. Graph 440 in stage 404 of FIG. 4 illustrates such a shift. The shifted water color value, represented by point 445, has moved toward the lower left (green) corner of graph 440 relative to the converted I-Q values, represented by point 435 of the water color in graph 430 in stage 403.

Some embodiments perform both the conversion to YIQ values and the shift of the water color toward green in one mathematical step. That is, in some embodiments, the conversions from RGB to YIQ values are performed using eqs. (3A)-(3B), which include a slight shift toward –Q and –I.

$$I = 0.596R - 0.2755G - 0.321B - 0.05 \quad (3A)$$

$$Q = 0.212R^{0.5} - 0.523G^{0.5} + 0.311B^{0.5} - 0.05 \quad (3B)$$

In eqs. (2A)-(2B), R is the rescaled value of $R_{ave}$. G is the rescaled value of $G_{ave}$. B is the rescaled value of $B_{ave}$.

In some embodiments, if the calculated Q value is too negative (e.g., more than a threshold distance below zero) the I value is decreased. The process 300 of FIG. 3 determines (at 330) whether the Q value is too negative (e.g., less than a threshold negative value such as –0.1). When the Q value is too negative, the process 300 decreases (at 335) the color value's I component. When the Q value is not too negative, the process 300 ends without changing the I value. In some embodiments, the process 300 uses eq. (4A) to adjust the I value and eq. (4B) if the Q value is not too negative.

$$\text{if } Q < -0.1 \text{ then } I_{adj} = I + 2(Q + 0.1) \quad (4A)$$

$$\text{if } Q > -0.1 \text{ then } I_{adj} = I \quad (4B)$$

In eqs. (4A) and (4B), I is the unadjusted I value and $I_{adj}$ is the I value after adjustment (or after adjustment is determined to be unnecessary). Graph 450 in stage 405 of FIG. 4 shows the I and Q values, represented by point 455, after such an adjustment. The process 300 of FIG. 3 then ends.

In some embodiments, the above described calculations and adjustments are used to automatically determine a color of water for an image. In some embodiments, either as an alternative option or instead of the automatic calculation, the image editing application provides a set of controls that allows a user to determine a color to use as the water color.

B. Adjusting Image Colors

Given a water color as a basis for color adjustments to the pixel of an image, the image editing application of some embodiments is able to adjust the colors while protecting the colors of the image. The applications of some embodiments include settings to determine the strength of the color adjustment and the balance between protecting and not protecting colors near the color of water.

Figure 5:
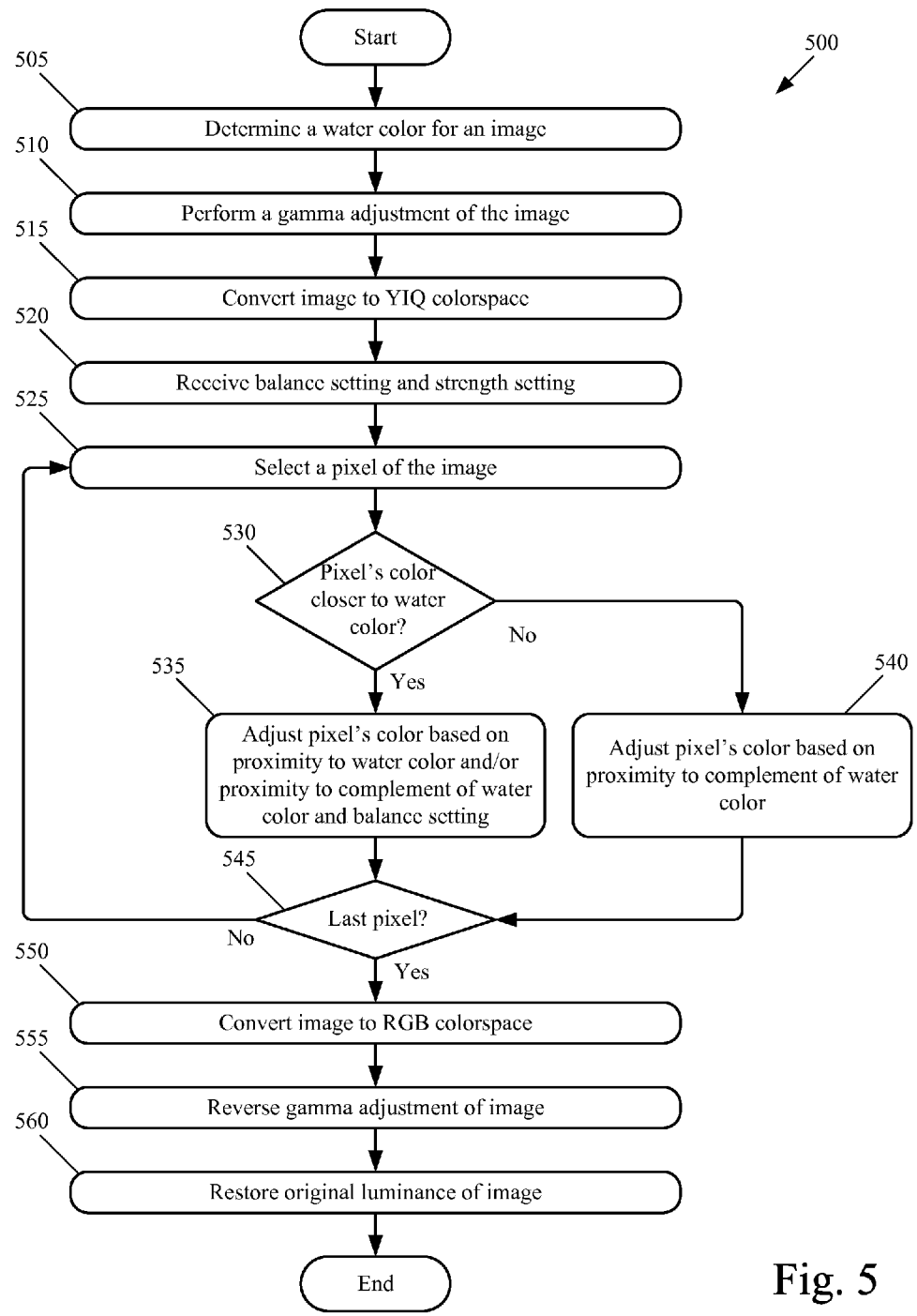
FIG. 5 conceptually illustrates a process of some embodiments for adjusting the colors of an image.

FIG. 5 conceptually illustrates a process 500 of some embodiments for adjusting the colors of an image (e.g., an image taken underwater). The process 500 is described with references to FIGS. 4 and 6-11. FIGS. 6-11 are described below as they become relevant to the process 500. The process 500 determines (at 505) a water color of an image (e.g., as described with respect to FIG. 4, above). The application of some embodiments uses the determined water color to adjust the colors of the image.

Figure 6:
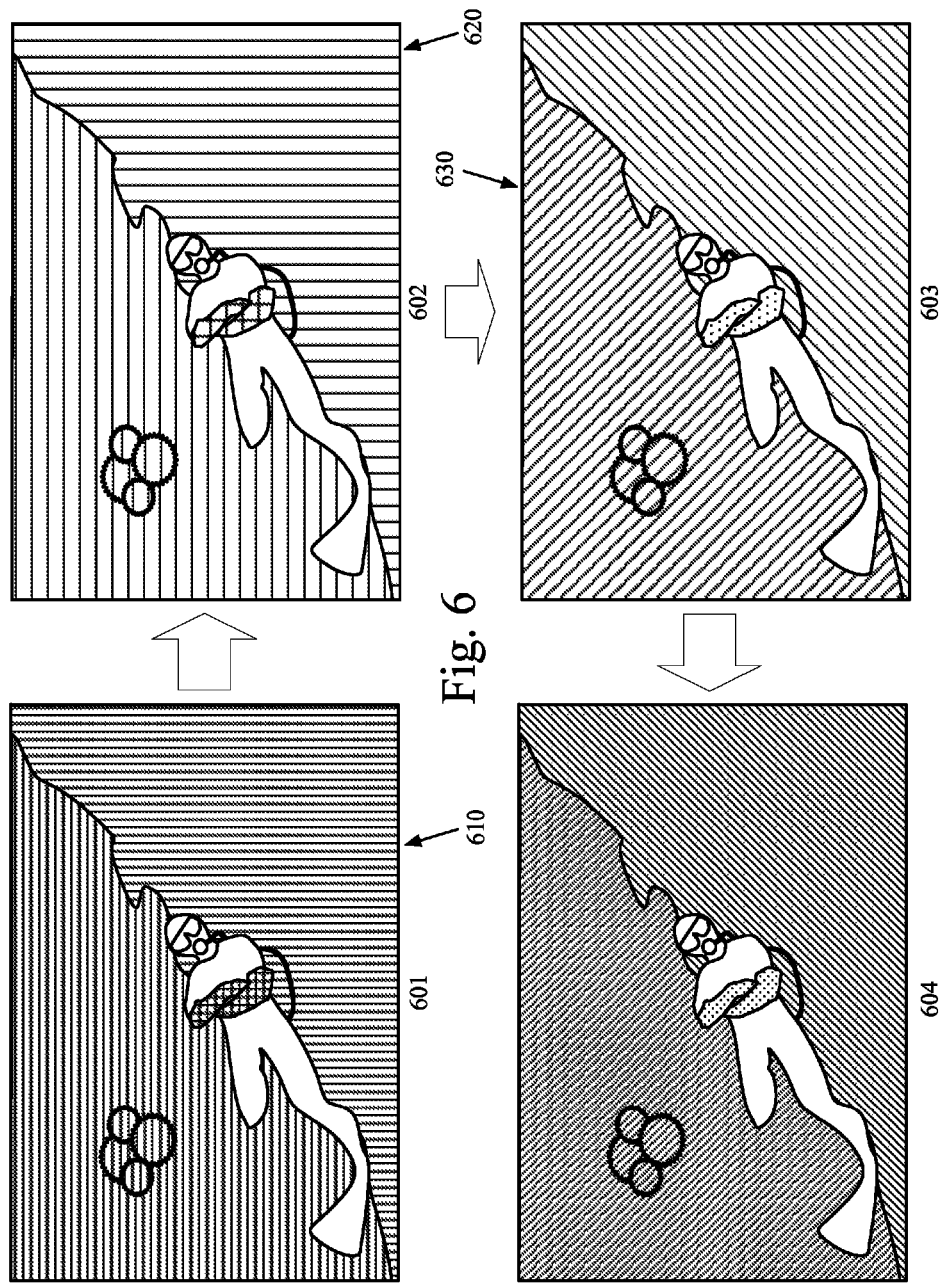
FIG. 6 illustrates an image during various stages of a color adjustment process.

The process 500 performs (at 510) a gamma adjustment on the image. FIG. 6 illustrates an image during various stages of a color adjustment process. The figure includes versions of the image before and after an initial gamma adjustment and a later inverse gamma adjustment. The gamma adjustment of some embodiments is performed by raising each component value of a pixel to a low power (e.g., ¼, ⅙, or ⅛). In some embodiments, the component values are between 0 and 1 inclusive, with 1 being the brightest and 0 being the dimmest. Raising the component values to a power less than 1 increases the component values and, therefore, brightens the pixels.

The first two stages 601 and 602 of FIG. 6 show such a gamma adjustment. In stage 601, an original image 610 is shown. In stage 602, a gamma adjusted image 620 is shown. The gamma adjusted image 620 is lighter than the original image because a gamma adjustment by a low power increases each of the R, G, and B color values between 0 and 1. In the figure, the lightening of the image as a result of the gamma adjustment from stage 601 to stage 602 is represented by a reduction in the density of the patterns representing various colors in the image. In the gamma adjusted image, the color contrast of pixels with very low color component values is expanded (and the component value increased), while the color contrast of pixels with higher color component values is compressed (and concentrated near the top of the scale). The color adjustments between stages 602 and 603 are more complex and will be described with respect to operations 515-545 of FIG. 5. In FIG. 6, the color adjustment from stage 602 to stage 603 is represented by a change of patterns in the image.

Stages 603 to 604 illustrate a gamma adjustment of the color adjusted image 630. The gamma adjustment is the inverse operation of the original gamma adjustment of the image 610. The inverse gamma adjustment of some embodiments applies an exponent of greater than 1 to the color values of each pixel. In some embodiments, the component values are between 0 and 1 inclusive, with 1 being the brightest and 0 being the dimmest. Raising the component values to a power greater than 1 decreases the component values and, therefore, darkens the pixels. In FIG. 6, the darkening of the image as a result of the gamma adjustment from stage 603 to stage 604 is represented by a reduction in the density of the patterns representing various colors in the image.

After the initial gamma adjustment of the image, the process 500 of FIG. 5 then converts (at 515) the image into a YIQ colorspace. In some embodiments, the water color conversion and the image conversion are done into some other colorspace with at least one luminance value and two chrominance values (e.g., YUV colorspace, etc.).

The process 500 receives (at 520) a balance setting that determines how much to protect colors near the determined water color from color adjustments and a strength setting that provides an overall strength for the color adjustment. In some embodiments, the process determines the balance and/or strength settings automatically. In other embodiments, the process receives the balance and/or strength settings from a user.

The process 500 then selects (at 525) a pixel of the image. The process 500 determines (at 530) whether the color of the selected pixel is closer to the previously determined water color or to the complement of the water color. In some embodiments, the determination is made using eqs. (5A)-(5B).

$$\text{waterchroma} = ((I - I_{water})^2 + (Q - Q_{water})^2)^{0.5} \quad (5A)$$

$$\text{antichroma} = ((I + I_{water})^2 + (Q + Q_{water})^2)^{0.5} \quad (5B)$$

In eqs. (5A) and (5B), $I_{water}$ represents the I component of the determined color of the water. $Q_{water}$ represents the Q component of the determined color of the water. I represents the I component of the pixel's color. Q represents the Q component of the pixel's color. Waterchroma represents the distance (in colorspace) of the chromatic components of the pixel (e.g., I and Q) from the chromatic components of the water color. Antichroma represents the distance (in colorspace) of the chromatic components of the pixel (e.g., I and Q) from the chromatic components of the complement of the water color. When antichroma is smaller than waterchroma, the pixel chromatic components are closer to the complement of the water color than to the water color. When waterchroma is smaller than antichroma, the pixel chromatic components are closer to the water color than to the complement of the water color.

Figure 7:
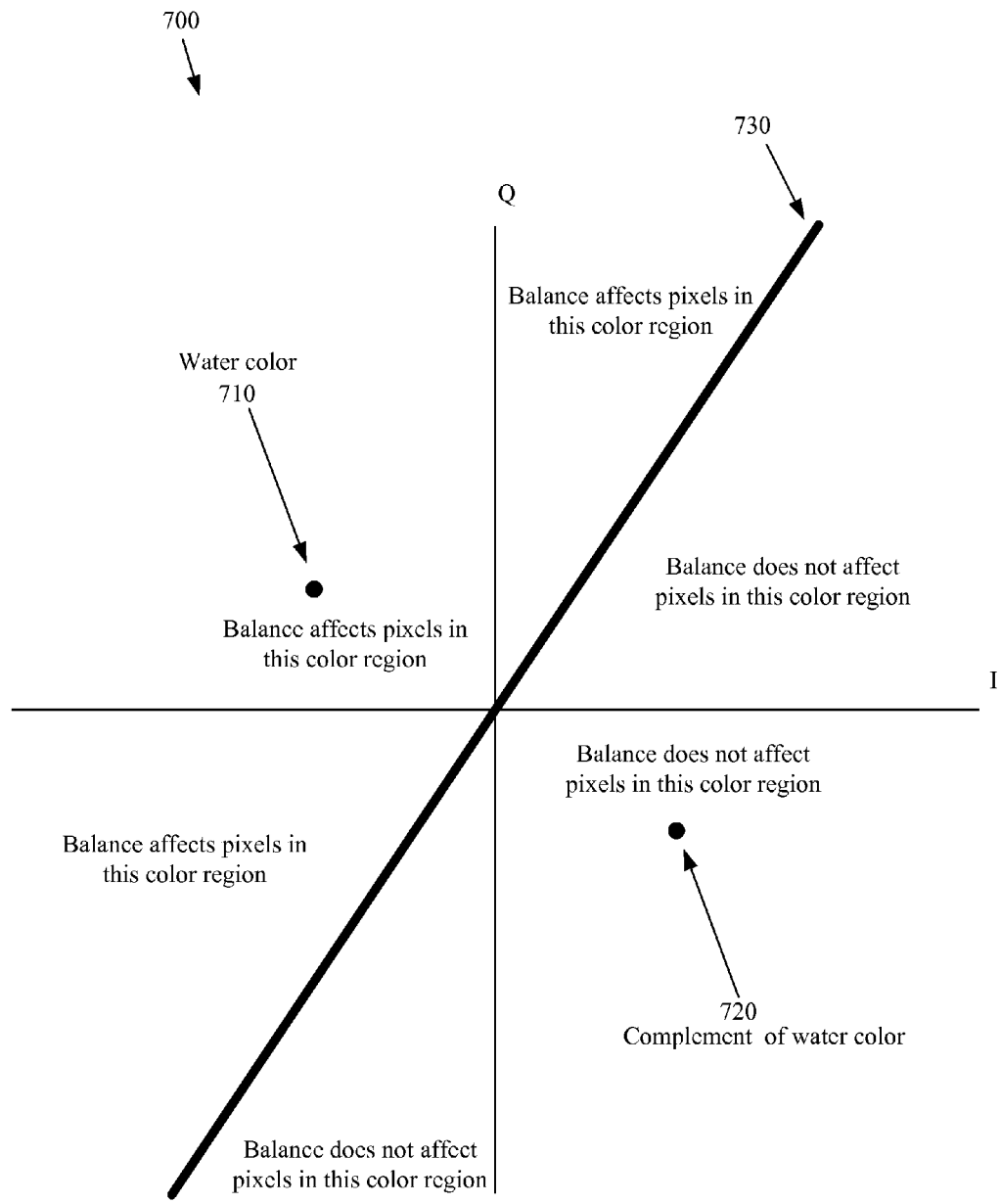
FIG. 7 conceptually illustrates an example of regions with colors that are closer to an exemplar water color than to its corresponding complement color.

FIG. 7 conceptually illustrates an example of regions that have colors closer to an exemplar water color than to its corresponding complement color. In this figure, graph 700 displays water color 710, complement 720 of the water color, and line 730. Water color 710 represents the I and Q values of the determined water color. Complement 720 represents the I and Q values of the complementary color from the water color. Line 730 represents all the colors that are equidistant from both the water color 710 and the complement 720. The applications of some embodiments adjust the colors of pixels on both sides of the line 730 and on the line 730. However, when the applications of some embodiments determine magnitudes for the color adjustments of pixels with colors on the water color 710 side of the line 730, these magnitudes are affected by the balance setting. In contrast, when these applications determine magnitudes for the color adjustments of pixels with colors on the complement 720 side of the line 730 or on the line 730, these magnitudes are not affected by the balance setting.

When the process 500 of FIG. 5 determines (at 530) that the pixel's color is closer to the water color than to the complement of the water color, the process 500 adjusts (at 535) the pixel's color based on the proximity of the pixel's color to the water color and/or the pixel's color's proximity to the complement of the water color. In some embodiments, when the balance is set fully to protect the water color, the magnitude of the color adjustment will be based on the distance of the pixel's color from the water color, but not on the distance from the pixel's color to the complement of the water color. In contrast, when the balance is set fully to not protect the water color, the magnitude of the color adjustment will not be based on the distance of the pixel's color from the water color, but will be based on the distance from the pixel's color to the complement of the water color. When the balance setting is between the extremes, the magnitude of the color adjustment is based on a weighted average of the distance of the pixel's color to each of the water color and the complement of the water color. The process of some embodiments uses eqs. (6) and (7) to provide a multiplier for the adjustment.

$$\text{chroma} = \text{waterchroma} * \text{balance} + (1 - \text{balance}) * \text{antichroma} \quad (6)$$

$$\text{shift} = \text{chroma}^2 * \text{strength} \quad (7)$$

Figure 10:
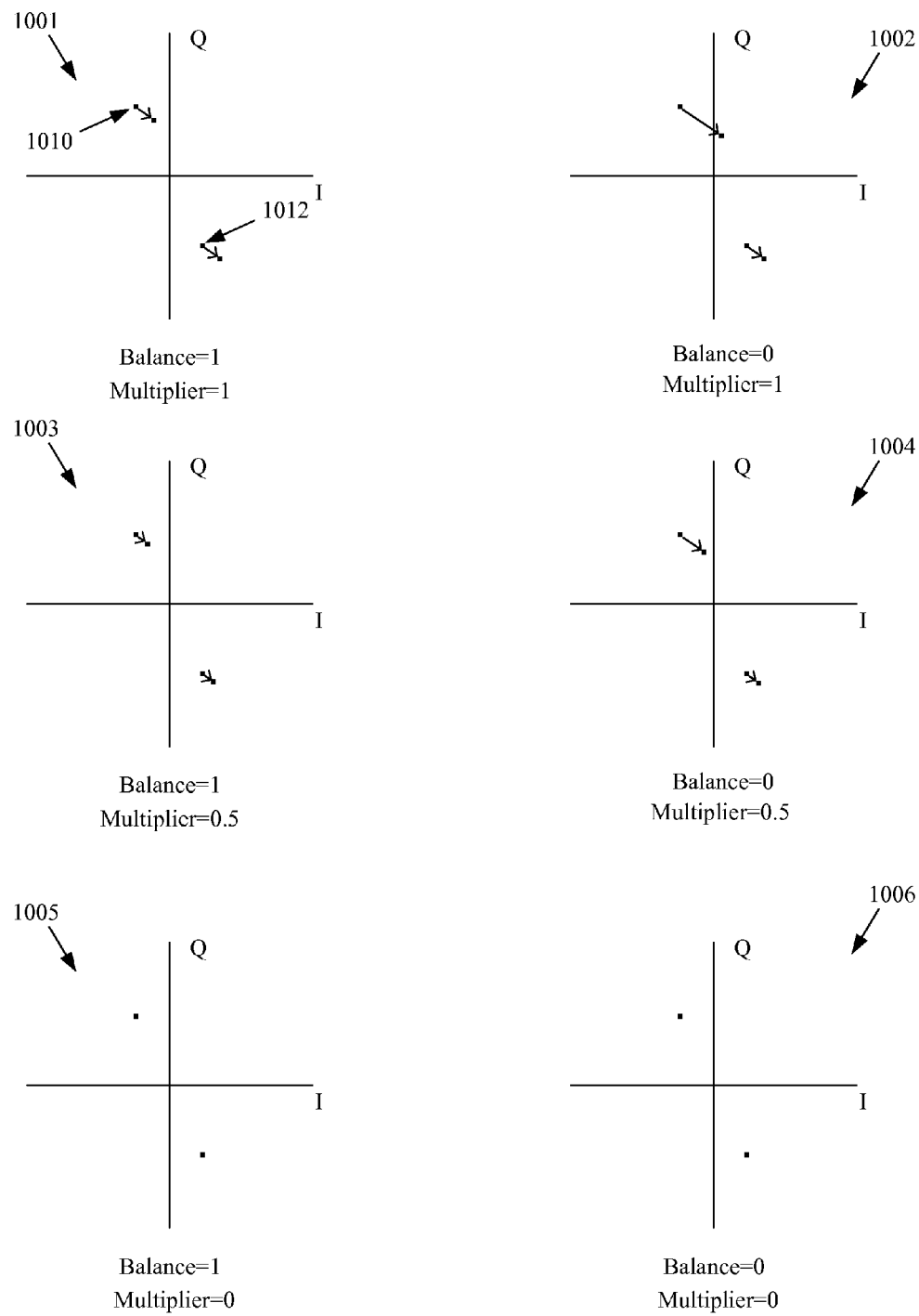
FIG. 10 conceptually illustrates the effects of various strength and balance settings on pixel's colors near the water color and near the complement of the water color.

In eq. (6), waterchroma is the distance from the pixel's color to the water color. Antichroma is the distance from the pixel's color to the complement of the water color. Balance determines the weight for a weighted average of waterchroma and antichroma. In eqs. (6) and (7) chroma is the weighted average of the waterchroma and antichroma values. In eq. (7), shift is a multiplier used in the color adjustment of the pixel. Strength determines an overall strength of the color adjustment (the effects of the strength setting are shown in FIG. 10, described below).

Once the multiplier has been determined, some embodiments use eqs. (8A) and (8B) to determine the adjusted color values for the pixel.

$$I_{adj} = I - I_{water} * \text{shift} \quad (8A)$$

$$Q_{adj} = Q - Q_{water} * \text{shift} \quad (8B)$$

In eqs. (8A) and (8B), $I_{water}$ represents the I component of the determined color of the water. $Q_{water}$ represents the Q component of the determined color of the water. I represents the I component of the pixel's color. Q represents the Q component of the pixel's color. $I_{adj}$ is the I component of the adjusted pixel's color. $Q_{adj}$ is the Q component of the adjusted pixel's color.

FIG. 8 conceptually illustrates the adjustment of a color close to the water color for various balance values. The figure includes multiple graphs 801-806, which will be individually described. In some embodiments, the graphs are conceptual of the calculations being performed and no such graph is actually displayed to the user. Graph 801 shows the location in I-Q space of the color of water 810 (e.g., as determined by the process described with respect to FIG. 4) and the complement 812 of the color of water. In some embodiments, the complement of the water color is determined by reversing the sign of the I and Q values of the water color. In some embodiments, the complement of the water color is not directly calculated and is represented in calculations by, e.g., adding the component values of the water color rather than subtracting the component values of the complement of the water color. Graph 802 shows an exemplar starting pixel's color 820, waterchroma distance 822, and antichroma distance 824. Waterchroma distance 822 is smaller than antichroma distance 824; therefore a balance setting will affect the color adjustment of this starting pixel's color 820.

Graph 803 shows the direction 830 of the complement of the water color. In some embodiments, the color adjustments of each pixel's color are in that direction 830. Graphs 804, 805, and 806 show the color adjustment of the starting pixel's color 820 to ending pixel's colors 840, 850, and 860, respectively. For graph 804, the balance setting 842 is 1. Therefore, the adjusted pixel's color depends on the (small) distance from the starting pixel's color 820 to the water color 810 and not on the (large) distance from the starting pixel's color 820 to the complement 812 of the water color. Accordingly, the adjustment is small when the balance is high. For graph 805, the balance setting 852 is 0.5. Therefore, the adjusted pixel's color depends equally on the (small) distance from the starting pixel's color 820 to the water color 810 and on the (large) distance from the starting pixel's color 820 to the complement 812 of the water color. Accordingly, the adjustment is intermediate when the balance is intermediate. For graph 806, the balance setting 862 is 0. Therefore, the adjusted pixel's color does not depend on the (small) distance from the starting pixel's color 820 to the water color 810, but does depend on the (large) distance from the starting pixel's color 820 to the complement 812 of the water color. Accordingly, the adjustment is large when the balance is low.

When the process 500 of FIG. 5 determines (at 530) that the pixel's color is farther from the water color than the complement of the water color, the process 500 adjusts (at 540) the pixel's color based on the proximity of the pixel's color to the complement of the water color. In some embodiments, the balance setting does not affect the adjustment of such pixels. The process of some embodiments uses eqs. (9) and (10) to provide a multiplier for the adjustment.

$$\text{chroma}=\text{antichroma} \quad (9)$$

$$\text{shift}=\text{chroma}^2*\text{strength} \quad (10)$$

In eq. (9), antichroma is the distance from the pixel's color to the complement of the water color. In eqs. (9) and (10) chroma is equal to the antichroma value. In eq. (10), shift is a multiplier used in the color adjustment of the pixel. Strength determines an overall strength of the color adjustment (the effects of the strength setting are shown in FIG. 10, described below).

Once the multiplier has been determined, some embodiments use the same eqs. (8A) and (8B) to determine the adjusted color values for a pixel closer to the complement as is used to determine the adjusted color value for a pixel closer to the water color.

$$I_{adj}=I-I_{water}*\text{shift} \quad (8A)$$

$$Q_{adj}=Q-Q_{water}*\text{shift} \quad (8B)$$

In eqs. (8A) and (8B), $I_{water}$ represents the I component of the determined color of the water. $Q_{water}$ represents the Q component of the determined color of the water. I represents the I component of the pixel's color. Q represents the Q component of the pixel's color. $I_{adj}$ is the I component of the adjusted pixel's color. $Q_{adj}$ is the Q component of the adjusted pixel's color.

Figure 9:
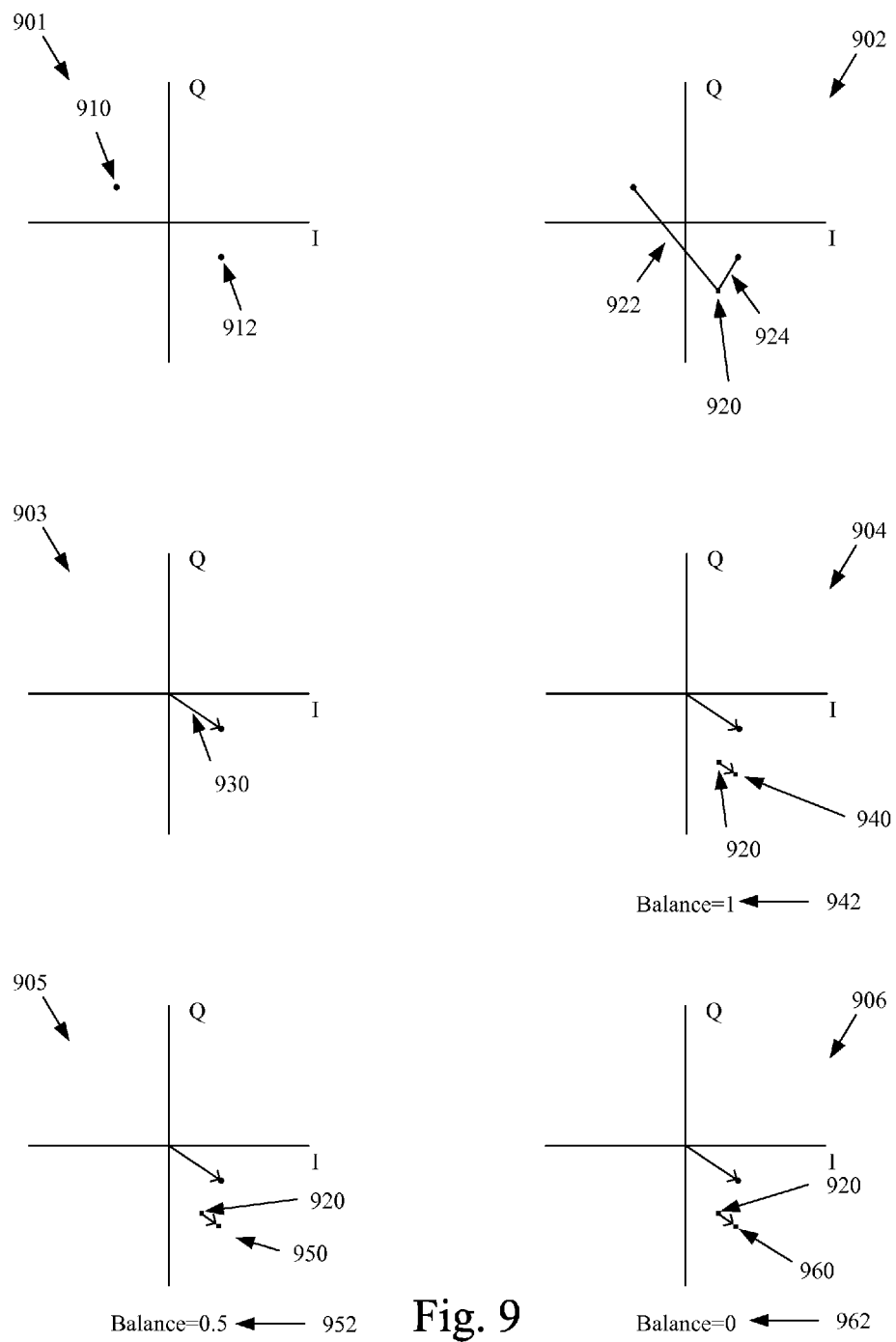
FIG. 9 conceptually illustrates the adjustment of a color close to the complement of the water color for various balance values.

FIG. 9 conceptually illustrates the adjustment of a color close to the complement of the water color for various balance values in some embodiments. The balance values in such embodiments have no effect because the pixel's color is closer to the complement of the water color than to the water color (e.g., because equations (9) and (10), which does not depend on the balance value are used to calculate the shift value, rather than equations (6) and (7), which do depend on the balance value). In FIG. 9 multiple balance values are shown to demonstrate the effects (or lack thereof) of various balance values on a pixel with a color closer to the complement of water color. The lack of effect in FIG. 9 contrasts with the effects (in FIG. 8) of the same set of balance values on a pixel color that is closer to the water color than to the complement of the water color. FIG. 9 includes multiple graphs 901-906, which will be individually described. In some embodiments, the graphs are conceptual of the calculations being performed and no such graph is actually displayed to the user. Graph 901 shows the location in I-Q space of the color of water 910 (e.g., as determined by the process described with respect to FIG. 4) and the complement 912 of the color of water. In some embodiments, the complement of the water color is determined by reversing the sign of the I and Q values of the water color. In some embodiments, the complement of the water color is not directly calculated and is represented in calculations by, e.g., adding the component values of the water color rather than subtracting the component values of the complement of the water color. Graph 902 shows an exemplar starting pixel's color 920, waterchroma distance 922, and antichroma distance 924. Waterchroma distance 922 is larger than antichroma distance 924; therefore a balance setting will not affect the color adjustment of this starting pixel's color 920.

Graph 903 shows the direction 930 of the complement 912 of the water color. In some embodiments, the color adjustments of each pixel's color are in that direction 930. Graphs 904, 905, and 906 show the color adjustment of the starting pixel's color 920 to ending pixel's colors 940, 950, and 960, respectively. For graph 904, the balance setting 942 is 1. For graph 905, the balance setting 952 is 0.5. For graph 906, the balance setting 962 is 0. However, the adjusted pixel's color does not depend on the balance value and therefore is identical regardless of the balance setting. The magnitude of the adjustment is small because the distance from the complement 912 of the water color is small.

In some embodiments, regardless of whether a pixel is closer to the water color or closer to the complement of the water color, the strength setting affects the magnitude of the color adjustment. FIG. 10 conceptually illustrates the effects of various strength and balance settings on pixel's colors near the water color and near the complement of the water color. The figure includes graphs 1001-1006. Each graph includes two starting color points 1010 and 1012. Color point 1010 is close to a water color (not shown). Color point 1012 is close to the complement (not shown) of the water color. In graphs 1001-1004, the colors represented by the starting color points 1010 and 1012 change depending on the location of the starting color points, the balance setting, and the strength setting.

Graph 1001 shows the adjustments of the color points 1010 and 1012 when the strength is set to 1 (at the highest strength available) and the balance is set to 1 (highest level of protection for colors closer to the water color than the complement of the water color). Regardless of the balance setting, the adjustment of the color point 1012 is determined by its proximity to the complement of the water color. The color point 1012 is close to the complement (not shown) of the water color, therefore the adjustment is small. In some embodiments, the small adjustment of the colors close to the complement of the water color reduces the incidence of oversaturation of the adjusted colors. Under the illustrated balance setting, the adjustment of the color point 1010 is determined by its proximity to the water color. The color point 1010 is close to the water color (not shown), therefore the adjustment is small. In some embodiments, the small adjustment of the colors close to the water color allows the image to maintain water colors in those areas that were already a color close to the water color (e.g., the water). However, in those areas that are colors other than the water color, but are tinted by the effects of the water on the lighting of the scene, the color adjustment is greater.

In contrast to graph 1001, graph 1002 shows the adjustments of the color points 1010 and 1012 when the strength is set to 1 (at the highest strength available) and the balance is set to 0 (no protection for colors closer to the water color than the complement of the water color). As mentioned above, regardless of the balance setting, the adjustment of the color point 1012 is determined by its proximity to the complement of the water color. The color point 1012 is close to the complement (not shown) of the water color, therefore the adjustment is small. Under the illustrated balance setting, the adjustment of the color point 1010 is also determined by its proximity to the complement of the water color. The color point 1010 is far from the complement of the water color (not shown), therefore the adjustment is large. In some embodiments, a large adjustment of the colors close to the water color prevents the image from maintaining water colors in those areas that (in the original image) are already a color close to the water color (e.g., the water in the image). Therefore, the colors close to the water color shift even more than the colors near the complement of the water color.

In graphs 1003 and 1004, the balance settings are the same as for graphs 1001 and 1002 respectively, but the strength settings are half (0.5) of what they are in graphs 1001 and 1002. Accordingly, all adjustments are reduced to half of what they are in the corresponding graphs 1001 and 1002. Finally, in graphs 1005 and 1006, the strength settings are reduced to zero. Therefore the adjustments are also reduced to zero regardless of the proximity of the color points 1010 and 1012 to the water color or the complement of the water color.

In some embodiments, the strength setting is determined automatically. In some such embodiments, the applications use eq. (11) to determine an automatic setting for the strength. In some embodiments, the automatic setting is provided as a default setting and the application provides a control (e.g., a slider or a pair of arrows) that allows the user to change the strength setting.

$$\text{strength} = (4*(I_{water}*I_{water} + Q_{water}*Q_{water}))^{-1} \quad (11)$$

In eq. (11), $I_{water}$ represents the I component of the determined color of the water. $Q_{water}$ represents the Q component of the determined color of the water. Strength represents the automatically determined strength setting.

In the previously described factors relating to color adjustment, the luminance value of the pixels being adjusted has not been a factor. However, in some embodiments, the process 500 of FIG. 5 sometimes adjusts (at 535 or 540) the colors of pixels that are either very bright, or very dark. In some cases, large color changes in dark areas or bright areas of an image are undesirable. For example, it is undesirable to turn the shadows or highlights of an image (e.g., blacks, bubbles, specular reflections, etc.) to the complement of the water color (e.g., pink). Accordingly, the process 500 of some embodiments reduces the magnitude of the color adjustment based on the luminance (e.g., Y component value) of the pixel that the process 500 is adjusting.

In some embodiments, eqs. (12A), (12B), (13A), and (13B) are used to reduce the magnitude of the adjustment.

$$\text{If } Y<0.9 \text{ then damp} = Y \quad (12A)$$

$$\text{If } Y>0.9 \text{ then damp} = 9-9*Y \quad (12B)$$

$$I_{adj} = I - I_{water}*\text{shift}*\text{damp} \quad (13A)$$

$$Q_{adj} = Q - Q_{water}*\text{shift}*\text{damp} \quad (13B)$$

In eqs. (12A), (12B), (13A), and (13B), damp is an additional factor that reduces the magnitude of color adjustments. Y is the luminance of the pixel. $I_{water}$ represents the I component of the determined color of the water. $Q_{water}$ represents the Q component of the determined color of the water. I represents the I component of the pixel's color. Q represents the Q component of the pixel's color. $I_{adj}$ is the I component of the adjusted pixel's color. $Q_{adj}$ is the Q component of the adjusted pixel's color.

Figure 11:
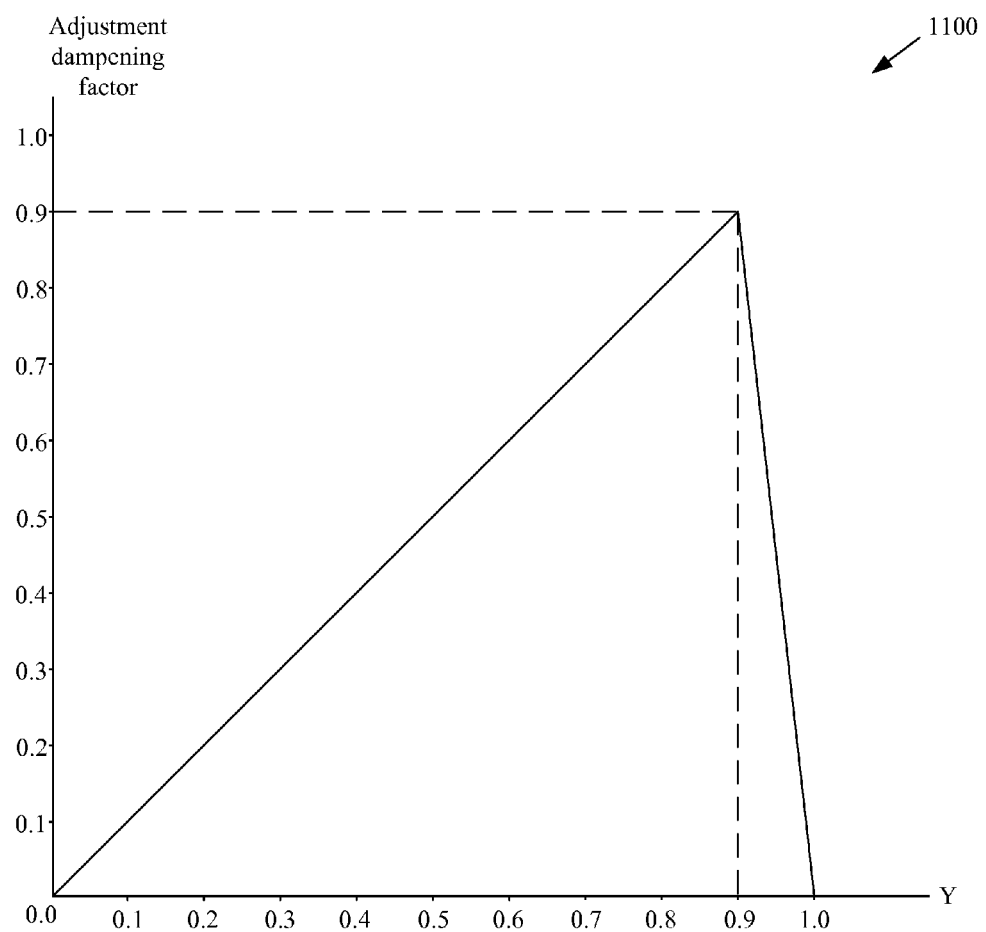
FIG. 11 illustrates a graphical representation of the dampening factor of eqs. (12A) and (12B).

FIG. 11 illustrates a graphical representation of the dampening factor of eqs. (12A) and (12B). The figure includes graph 1100 which shows a plot of luminance value vs. dampening factor. When the luminance of a pixel is low, the adjustment amount is multiplied by a small number. When the luminance of a pixel is higher, but under 0.9 the adjustment amount is increased. When the luminance of the pixel is at 0.9, the adjustment amount is at a maximum. When the luminance of the pixel is greater than 0.9, the adjustment amount decreases rapidly with luminance level until, at a luminance of 1, the adjustment is canceled entirely. Eqs. (12A) and (12B) represent a specific dampening function of some embodiments. However, one of ordinary skill in the art will understand that in other embodiments, other dampening functions are used. While in still other embodiments, no dampening function is used.

After the pixel is color adjusted (at 535 or 540), the process 500 of FIG. 5 then determines (at 545) whether the most recently adjusted pixel was the last pixel in the image to be adjusted. When the pixel was not the last pixel in the image, the process 500 returns to operation 525 to select another pixel for adjustment. When the pixel was the last pixel to be adjusted, the process 500 converts (at 550) the image from the colorspace in which the adjustment was performed (e.g., the YIQ colorspace) to the RGB color space. The process 500 then applies (at 555) a gamma adjustment that is the inverse of the previous gamma adjustment (e.g., if the component values were previously raised to the power of ⅛ then in this operation they are raised to the power of 8).

In some embodiments, in order to ensure that the sequence of gamma correction-color correction-inverse gamma correction does not change the luminance levels of any of the pixels in the image, the process 500 restores (at 560) the original luminance values of the image by translating both the image that has been gamma adjusted, color adjusted, and inverse gamma adjusted and the uncorrected image (i.e., without gamma corrections and color adjustments applied) into YIQ colorspace. The process 500 replaces the Y component values of each of the pixels in the adjusted image with the Y component values of the corresponding pixels in the unadjusted image. The process 500 then ends.

II. Software Architecture

Figure 12:
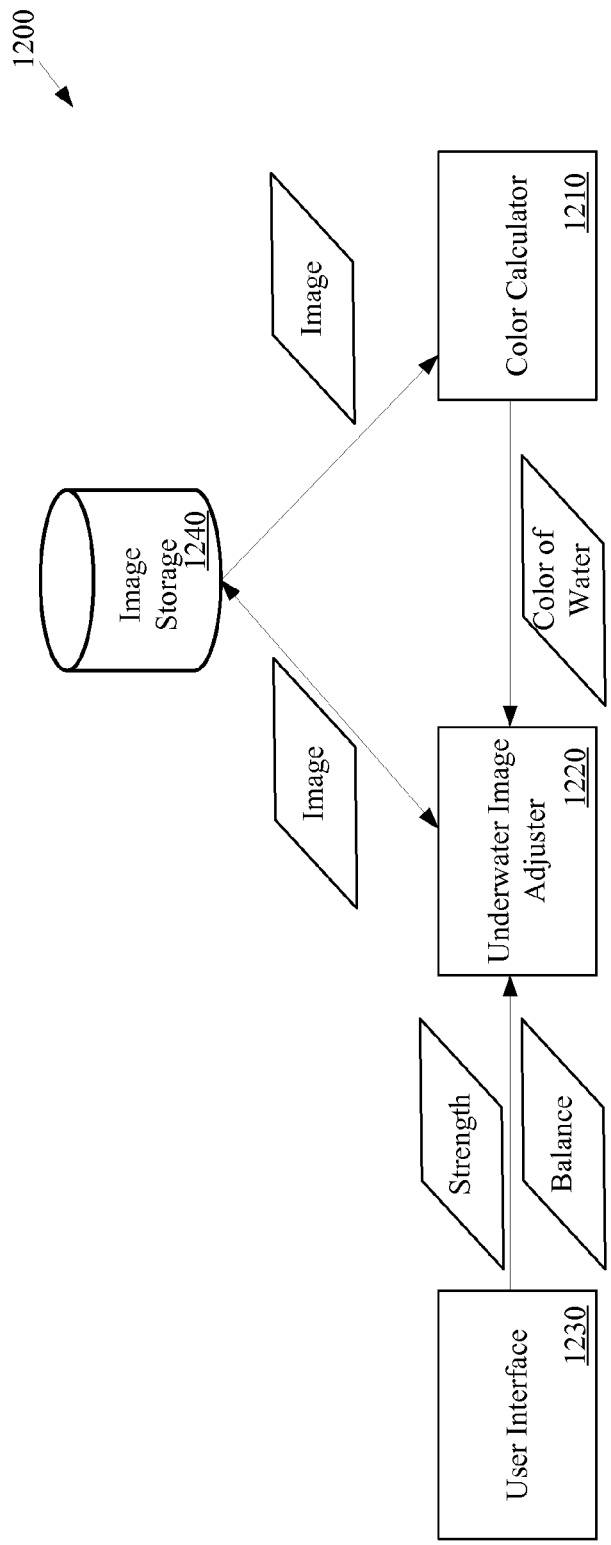
FIG. 12 conceptually illustrates software architecture of part of an image editing application of some embodiments.

FIG. 12 conceptually illustrates software architecture 1200 of part of an image editing application of some embodiments. The figure illustrates the part of the architecture that is concerned with adjusting the colors of an underwater image. One of ordinary skill in the art will understand that the image editing applications of some embodiments include other modules not covered in this figure. The figure includes color calculator 1210, underwater image adjuster 1220, user interface 1230, and image storage 1240. The color calculator 1210 of some embodiments performs the calculations that determine a color of water. The color calculator 1210 of some embodiments retrieves an image from image storage 1240 and uses equations (1A)-(4B) to calculate a color of water for the image. In some embodiments, the color calculator 1210 calculates I and Q components of a color of water in a YIQ colorspace. In some embodiments, the color calculator 1210 also determines a complement of the color of water. The color calculator then sends the color of water to the underwater image adjuster 1220.

The underwater image adjuster 1220 of some embodiments uses the calculated color of water (e.g., received from color calculator 1210) and strength and balance settings (e.g., received from the user interface 1230) to determine adjusted color values for each pixel in an image (e.g., received from image storage 1240). In some embodiments, the underwater image adjuster 1220 uses equations (5A)-(13B) to determine an adjusted color for each pixel. The underwater image adjuster 1220 of some embodiments then stores the adjusted image in the image storage 1240.

The user interface 1230 of some embodiments receives a balance and strength setting from a user and passes the balance and strength settings to the underwater image adjuster. In some embodiments, the user interface 1230 presents the user with controls such as controls 122 of FIG. 1 and determines the strength and balance settings based on a user's manipulation of the controls 122.

The image storage 1240 of some embodiments stores an original image (e.g., provided by a user) which can then be modified by the underwater image adjuster 1220 and/or other image adjustment modules (not shown) of the image editing application. In some embodiments, the image storage 1240 stores both the original image and the adjusted image separately (e.g., so that a user can undo an adjustment).

The software architecture diagram of FIG. 12 is provided to conceptually illustrate some embodiments. One of ordinary skill in the art will realize that some embodiments use different modular setups that may combine multiple functions into one module though the figure shows multiple modules, and/or may split up functions that the figure ascribes to a single module into multiple modules, and/or may recombine the split up functions in various modules. Furthermore different connections may be made among these modules. For example, in some embodiments the color calculator 1210 and the underwater image adjuster 1220 are combined into a single module.

III. Mobile Device

Figure 13:
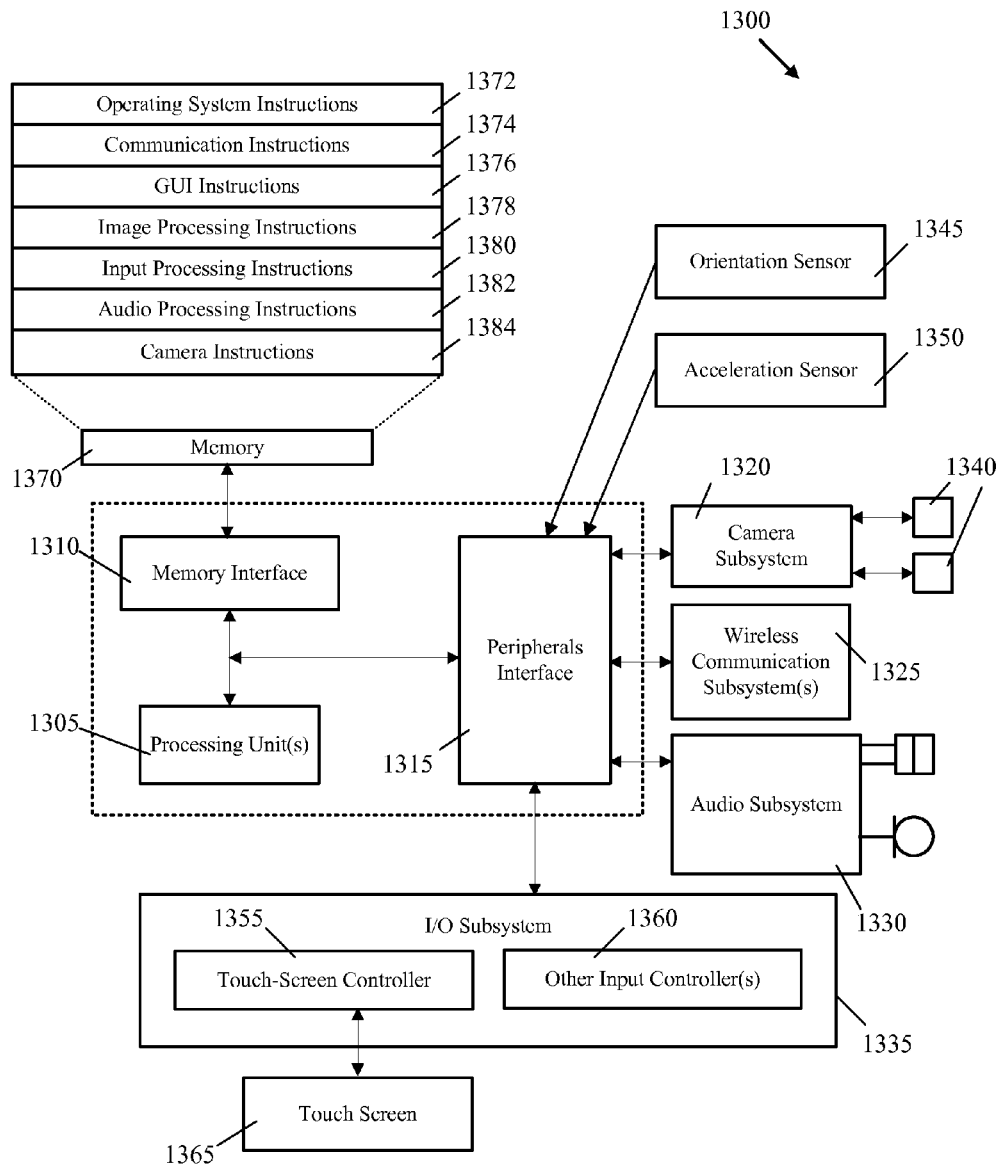
FIG. 13 is an example of an architecture of a mobile computing device.

The image organizing, editing, and viewing applications of some embodiments operate on mobile devices, such as smartphones (e.g., iPhones®) and tablets (e.g., iPads®). FIG. 13 is an example of an architecture 1300 of such a mobile computing device. Examples of mobile computing devices include smartphones, tablets, laptops, etc. As shown, the mobile computing device 1300 includes one or more processing units 1305, a memory interface 1310 and a peripherals interface 1315.

The peripherals interface 1315 is coupled to various sensors and subsystems, including a camera subsystem 1320, a wireless communication subsystem(s) 1325, an audio subsystem 1330, an I/O subsystem 1335, etc. The peripherals interface 1315 enables communication between the processing units 1305 and various peripherals. For example, an orientation sensor 1345 (e.g., a gyroscope) and an acceleration sensor 1350 (e.g., an accelerometer) is coupled to the peripherals interface 1315 to facilitate orientation and acceleration functions.

The camera subsystem 1320 is coupled to one or more optical sensors 1340 (e.g., a charged coupled device (CCD) optical sensor, a complementary metal-oxide-semiconductor (CMOS) optical sensor, etc.). The camera subsystem 1320 coupled with the optical sensors 1340 facilitates camera functions, such as image and/or video data capturing. The wireless communication subsystem 1325 serves to facilitate communication functions. In some embodiments, the wireless communication subsystem 1325 includes radio frequency receivers and transmitters, and optical receivers and transmitters (not shown in FIG. 13). These receivers and transmitters of some embodiments are implemented to operate over one or more communication networks such as a GSM network, a Wi-Fi network, a Bluetooth network, etc. The audio subsystem 1330 is coupled to a speaker to output audio (e.g., to output voice navigation instructions). Additionally, the audio subsystem 1330 is coupled to a microphone to facilitate voice-enabled functions, such as voice recognition (e.g., for searching), digital recording, etc.

The I/O subsystem 1335 involves the transfer between input/output peripheral devices, such as a display, a touch screen, etc., and the data bus of the processing units 1305 through the peripherals interface 1315. The I/O subsystem 1335 includes a touch-screen controller 1355 and other input controllers 1360 to facilitate the transfer between input/output peripheral devices and the data bus of the processing units 1305. As shown, the touch-screen controller 1355 is coupled to a touch screen 1365. The touch-screen controller 1355 detects contact and movement on the touch screen 1365 using any of multiple touch sensitivity technologies. The other input controllers 1360 are coupled to other input/control devices, such as one or more buttons. Some embodiments include a near-touch sensitive screen and a corresponding controller that can detect near-touch interactions instead of or in addition to touch interactions.

The memory interface 1310 is coupled to memory 1370. In some embodiments, the memory 1370 includes volatile memory (e.g., high-speed random access memory), non-volatile memory (e.g., flash memory), a combination of volatile and non-volatile memory, and/or any other type of memory. As illustrated in FIG. 13, the memory 1370 stores an operating system (OS) 1372. The OS 1372 includes instructions for handling basic system services and for performing hardware dependent tasks.

The memory 1370 also includes communication instructions 1374 to facilitate communicating with one or more additional devices; graphical user interface instructions 1376 to facilitate graphic user interface processing; image processing instructions 1378 to facilitate image-related processing and functions; input processing instructions 1380 to facilitate input-related (e.g., touch input) processes and functions; audio processing instructions 1382 to facilitate audio-related processes and functions; and camera instructions 1384 to facilitate camera-related processes and functions. The instructions described above are merely exemplary and the memory 1370 includes additional and/or other instructions in some embodiments. For instance, the memory for a smartphone may include phone instructions to facilitate phone-related processes and functions. Additionally, the memory may include instructions for an image organizing, editing, and viewing application. The above-identified instructions need not be implemented as separate software programs or modules. Various functions of the mobile computing device can be implemented in hardware and/or in software, including in one or more signal processing and/or application specific integrated circuits.

While the components illustrated in FIG. 13 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 13 may be split into two or more integrated circuits.

IV. Computer System

Figure 14:
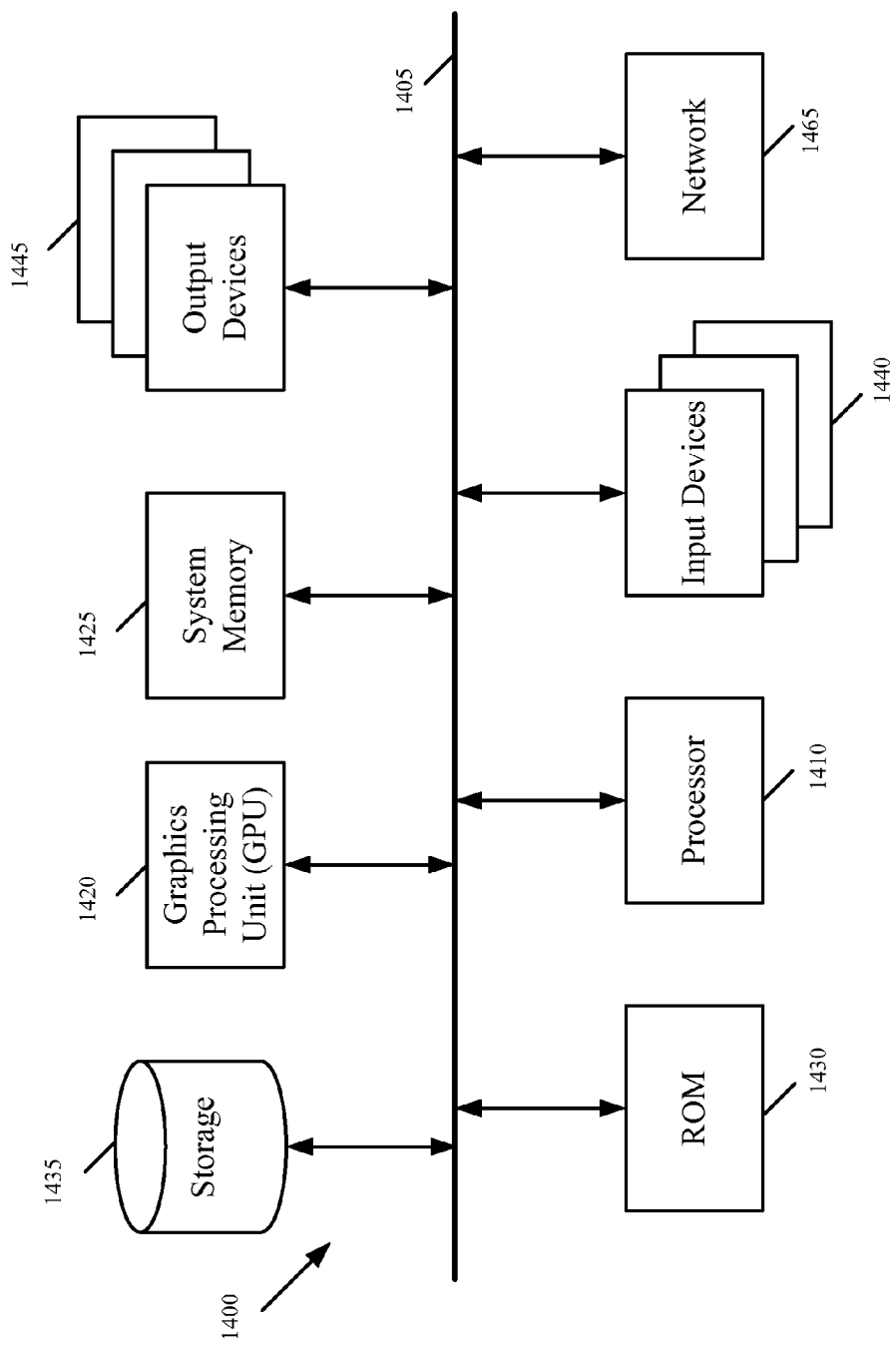
FIG. 14 conceptually illustrates another example of an electronic system with which some embodiments of the invention are implemented.

FIG. 14 conceptually illustrates another example of an electronic system 1400 with which some embodiments of the invention are implemented. The electronic system 1400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1400 includes a bus 1405, processing unit(s) 1410, a graphics processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the GPU 1415, the system memory 1420, and the permanent storage device 1435.

From these various memory units, the processing unit(s) 1410 retrieves instructions to execute and data to process in order to execute the processes of the invention. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash memory device, etc., and its corresponding drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor needs at runtime. In some embodiments, the invention's processes are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While various processes described herein are shown with operations in a particular order, one of ordinary skill in the art will understand that in some embodiments the orders of operations will be different. For example in the process 500 of FIG. 5, the calculation of the water color is shown as taking place before the gamma adjustment of the image, but in other embodiments, the order may be reversed, or the operations may even run in parallel.

While various operations are described herein as taking place in specific colorspaces (e.g., RGB colorspace or YIQ colorspace) one of ordinary skill in the art will understand that comparable operations can be performed in other colorspaces in some embodiments. For example, the application of some embodiments perform color adjustments in a YUV colorspace or a $YC_bC_r$ colorspace instead of a YIQ colorspace. One of ordinary skill in the art will understand that the invention is not to be limited by the foregoing illustrative details, but rather is to be defined by the appended claims.

What is claimed is:

1. A method of adjusting colors of a digital image, the method comprising:
    calculating, using a computing device, for each pixel of a set of pixels of the digital image, a first distance in a color space from a first color to a color of the pixel;
    calculating, using the computing device, for each pixel of the set of pixels of the digital image, a second distance in the color space from a second color to the color of the pixel;
    based on the first and second distances, calculating, using the computing device, a strength value for each pixel; and
    adjusting, using the computing device, the color of each pixel of the set of pixels, wherein the adjustment is based on the strength value and the first color, to generate an adjusted digital image.

2. The method of claim 1, wherein the strength value is further based on a received value.

3. The method of claim 2, wherein the strength value is based on a weighted average of the first and second distances, wherein the weight of the weighted average is based on the received value.

4. The method of claim 3, wherein the received value is a first received value, wherein the strength value is further based on a second received value, wherein the strength value for each pixel scales with the second received value.

5. The method of claim 1, wherein the digital image is a second digital image and the color space is a second color space, the method further comprising generating said second digital image by translating a first digital image from a first color space into the second color space.

6. The method of claim 5, wherein the first color space is an RGB color space and the second color space defines pixels with a luminance value and at least two chrominance values.

7. The method of claim 5 further comprising applying a gamma adjustment to an original digital image to generate the first digital image before translating the first digital image to generate the second digital image.

8. The method of claim 7, wherein the adjusted digital image is a third digital image, the method further comprising:
    translating the third digital image to the first color space to generate a fourth digital image;
    applying an inverse gamma adjustment to the fourth digital image to generate a fifth digital image;
    translating the fifth digital image into the second color space to generate a sixth digital image;
    translating the original digital image into the second color space to generate a seventh digital image;
    replacing luminance values of pixels of a set of pixels of the sixth adjusted digital image with luminance values of corresponding pixels from the seventh digital image to generate an eighth digital image; and
    translating the eighth digital image to the first color space to generate a ninth digital image.

9. The method of claim 1, wherein the second color is a complement of the first color.

10. A method of adjusting colors of an original digital image, the method comprising:
    applying a gamma adjustment to the original digital image to generate a first digital image;
    translating the first digital image from a first color space to a second color space to generate a second digital image, wherein the second color space comprises a luminance value and at least two chrominance values;
    identifying a first color in the first color space;
    converting the first color to a second color in the second color space;
    for each pixel of a set of pixels of the second digital image, identifying a first difference between the second color and a color of the pixel;
    identifying a second difference between a complementary color of the second color and a color of each pixel of the set of pixels of the second digital image in the second color space;
    based on the first and second differences, calculating a strength value for each pixel; and
    adjusting each pixel color based on the strength value and the second color to generate a third digital image.

11. The method of claim 10, wherein the strength value for each pixel is further based on a first received value and a second received value, the first received value determines a first weighting factor that determines how much the strength value depends on the first difference and a second weighting factor that determines how much the strength value depends on the second distance, and the second received value determines a scaling factor for the strength value.

12. The method of claim 10 further comprising converting the third digital image into a final digital image by translating the third digital image from the second color space to the first color space while preserving luminance values of the original digital image.

13. A non-transitory machine readable medium storing an image editing program which, when executed on at least one processing unit adjusts colors of a digital image, the program comprising sets of instructions for:
    calculating, for each pixel of a set of pixels of the digital image, a first distance in a color space from a first color to a color of the pixel;
    calculating, for each pixel of the set of pixels of the digital image, a second distance in the color space from a second color to the color of the pixel;
    based on the first and second distances, calculating a strength value for each pixel; and
    adjusting the color of each pixel of the set of pixels, based on the strength value and the first color, to generate an adjusted digital image.

14. The non-transitory machine readable medium of claim 13, wherein the strength value is further based on a received value.

15. The non-transitory machine readable medium of claim 14, wherein the strength value is based on a weighted average of the first and second distances, wherein the weight of the weighted average is based on the received value.

16. The non-transitory machine readable medium of claim 15, wherein the received value is a first received value, wherein the strength value is further based on a second received value, wherein the strength value for each pixel scales with the second received value.

17. The non-transitory machine readable medium of claim 13, wherein the digital image is a second digital image and the color space is a second color space, the program further comprising a set of instructions for generating said second digital image by translating a first digital image from a first color space into the second color space.

18. The non-transitory machine readable medium of claim 17, wherein the first color space is an RGB color space and the second color space defines pixels with a luminance value and at least two chrominance values.

19. The non-transitory machine readable medium of claim 17, wherein the program further comprises a set of instructions for applying a gamma adjustment to an original digital image to generate the first digital image before translating the first digital image to generate the second digital image.

20. The non-transitory machine readable medium of claim 19, wherein the adjusted digital image is a third digital image, the program further comprising sets of instructions for:
    translating the third digital image to the first color space to generate a fourth digital image;
    applying an inverse gamma adjustment to the fourth digital image to generate a fifth digital image;
    translating the fifth digital image into the second color space to generate a sixth digital image;
    translating the original digital image into the second color space to generate a seventh digital image;
    replacing luminance values of pixels of a set of pixels of the sixth adjusted digital image with luminance values of corresponding pixels from the seventh digital image to generate an eighth digital image; and
    translating the eighth digital image to the first color space to generate a ninth digital image.

21. An electronic device comprising:
    a set of processing units; and
    a non-transitory machine readable medium storing an image editing program which when executed on at least one of the processing units adjusts colors of a digital image, the program comprising sets of instructions for:
        calculating, for each pixel of a set of pixels of the digital image, a first distance in a color space from a first color to a color of the pixel;
        calculating, for each pixel of the set of pixels of the digital image, a second distance in the color space from a second color to the color of the pixel;
        based on the first and second distances, calculating a strength value for each pixel; and
        adjusting the color of each pixel of the set of pixels, based on the strength value and the first color, to generate an adjusted digital image.

22. The electronic device of claim 21, wherein the strength value is further based on a weighted average of the first and second distances, wherein the weight of the weighted average is based on a received value.

23. The electronic device of claim 21, wherein the digital image is a second digital image and the color space is a second color space, the program further comprising a set of instructions for generating said second digital image by translating a first digital image from a first color space into the second color space.

24. A method of preserving luminance values of a digital image while adjusting color component values in the digital image, the method comprising:
    gamma adjusting pixel component values of an original image in a first color space to generate a first digital image;
    translating the first digital image to a second color space to generate a second digital image;
    adjusting pixel component values of the second digital image to generate a third digital image;
    translating the third digital image to the first color space to generate a fourth digital image;
    inverse gamma adjusting the fourth digital image to generate a fifth digital image;
    translating the fifth digital image to the second color space to generate a sixth digital image;
    translating the original digital image to the second color space to generate a seventh digital image;
    replacing luminance values of the sixth digital image with luminance values of the seventh digital image to generate an eighth digital image; and
    translating the eighth digital image to the first color space to generate a ninth digital image.

25. The method of claim 24, wherein the first color space is an RGB color space and the second color space uses a luminance value and at least two chrominance values to define a pixel.

26. The method of claim 24, wherein the first color space uses three chrominance values to define a pixel and the second color space is a YIQ color space.

* * * * *